(12) United States Patent
Tabata et al.

(10) Patent No.: US 12,084,061 B2
(45) Date of Patent: Sep. 10, 2024

(54) SOUND-SOURCE-CANDIDATE EXTRACTION SYSTEM AND SOUND-SOURCE SEARCH METHOD

(71) Applicant: TOYOTA JIDOSHA KABUSHIKI KAISHA, Toyota (JP)

(72) Inventors: Atsushi Tabata, Okazaki (JP); Masafumi Yamamoto, Nagakute (JP); Koichi Okuda, Toyota (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/517,340

(22) Filed: Nov. 2, 2021

(65) Prior Publication Data

US 2022/0194383 A1  Jun. 23, 2022

(30) Foreign Application Priority Data

Dec. 17, 2020  (JP) ................. 2020-209729

(51) Int. Cl.
  *B60W 40/02*   (2006.01)
  *G06V 20/56*   (2022.01)
  *G06V 20/59*   (2022.01)
  *G07C 5/08*    (2006.01)

(52) U.S. Cl.
  CPC ............ *B60W 40/02* (2013.01); *G06V 20/56* (2022.01); *G06V 20/59* (2022.01); *G07C 5/0833* (2013.01); *B60W 2420/54* (2013.01)

(58) Field of Classification Search
  CPC .. B60W 40/02; B60W 2420/54; G06V 20/56; G06V 20/59; G06V 10/16; G07C 5/0833; G07C 5/0866; G01H 9/00; G06F 18/22

USPC ............................................................ 701/1
See application file for complete search history.

(56) References Cited

U.S. PATENT DOCUMENTS

| 4,679,077 A * | 7/1987 | Yuasa | G08B 13/19691 |
| | | | 375/E7.263 |
| 8,699,754 B2 * | 4/2014 | Zhang | G06V 20/588 |
| | | | 348/148 |
| 9,226,070 B2 * | 12/2015 | Hyun | H04R 3/005 |
| 9,305,463 B1 * | 4/2016 | Yellambalase | G08G 1/167 |

(Continued)

FOREIGN PATENT DOCUMENTS

| CN | 112082781 B  * | 3/2022 | ........... G01M 17/08 |
| JP | 2010091282 A  * | 4/2010 | |

(Continued)

*Primary Examiner* — Jaime Figueroa
(74) *Attorney, Agent, or Firm* — Oliff PLC

(57) ABSTRACT

A sound-source-candidate extraction system for extracting a candidate of a sound source that causes a noise propagated inside or outside a cabin of a vehicle. The sound-source-candidate extraction system includes: (a) an imaging device configured to acquire data of an image inside or outside the cabin of the vehicle; and (b) an extracting device configured to extract the candidate of the sound source, depending on a difference between first and second image data acquired by the imaging device, wherein the first image data is the data of the image before generation of the noise, and the second image data is the data of the image upon or after the generation of the noise. Also disclosed is a sound-source search method using the sound-source-candidate extraction system.

4 Claims, 14 Drawing Sheets

(56) References Cited

U.S. PATENT DOCUMENTS

| | | | |
|---|---|---|---|
| 9,319,785 B2* | 4/2016 | Lee | H04R 3/005 |
| 9,922,258 B2* | 3/2018 | Kiyohara | G06V 20/586 |
| 10,107,676 B2* | 10/2018 | Doller | G01H 3/125 |
| 11,079,468 B2* | 8/2021 | Salmi | G01S 5/30 |
| 11,115,739 B2* | 9/2021 | Vilermo | H04R 1/005 |
| 2002/0181721 A1* | 12/2002 | Sugiyama | G01S 5/22 |
| | | | 381/92 |
| 2006/0126852 A1* | 6/2006 | Bruno | G06F 17/14 |
| | | | 381/61 |
| 2010/0098295 A1* | 4/2010 | Zhang | G08G 1/165 |
| | | | 348/148 |
| 2010/0157080 A1* | 6/2010 | Kondo | H04N 5/91 |
| | | | 348/222.1 |
| 2010/0316231 A1* | 12/2010 | Williams | H04R 3/005 |
| | | | 381/92 |
| 2012/0163624 A1* | 6/2012 | Hyun | H04R 3/005 |
| | | | 381/92 |
| 2013/0147835 A1* | 6/2013 | Lee | H04R 3/005 |
| | | | 381/92 |
| 2014/0169630 A1* | 6/2014 | Fukata | B60R 1/002 |
| | | | 382/103 |
| 2015/0302261 A1* | 10/2015 | Kiyohara | G06V 20/586 |
| | | | 382/104 |
| 2022/0329936 A1* | 10/2022 | Kobayashi | B60W 40/04 |

FOREIGN PATENT DOCUMENTS

| | | | |
|---|---|---|---|
| JP | 2011233090 A | * | 11/2011 |
| JP | 2014016308 A | * | 1/2014 |
| WO | WO-2017191362 A1 | * | 11/2017 |

* cited by examiner

FIG.6

| EVENT NUMBER | DATE | VEHICLE CHANGE EVENT | SUBJECT |
|---|---|---|---|
| 10010 | 2025.10.1 | ATTACHMENT OF ACCESSORY | USER |
| 10011 | 2025.10.2 | ATTACHMENT OF CUP HOLDER | USER |
|  |  |  |  |
| 10202 | 2025.12.5 | REPLACEMENT OF WIPER RUBBER | DEALER |
| 10203 | 2025.12.6 | REPLACEMENT OF REAR TIRE | DEALER |
|  |  |  |  |
| 11402 | 2026.2.3 | PARTIAL DEFORMATION OF LEFT-SIDE MIRROR | ACCIDENT |
|  |  |  |  |
| 11801 | 2026.3.8 | ATTACHMENT OF VEHICLE GROUND KIT | USER |
|  |  |  |  |
| 12003 | 2026.4.1 | ATTACHMENT OF WHEEL CAP | USER |
|  |  |  |  |
| 12333 | 2026.5.25 | ATTACHMENT OF TOWING KIT | USER |
|  |  |  |  |
| 12354 | 2026.6.4 | REPLACEMENT OF BATTERY | DEALER |

SOUND-SOURCE-CANDIDATE EXTRACTION SYSTEM AND SOUND-SOURCE SEARCH METHOD

This application claims priority from Japanese Patent Application No. 2020-209729 filed on Dec. 17, 2020, the disclosure of which is herein incorporated by reference in its entirety.

FIELD OF THE INVENTION

The present invention relates to a sound-source-candidate extraction system and a sound-source search method for searching a sound source that causes a noise propagated inside or outside a cabin of a vehicle.

BACKGROUND OF THE INVENTION

In JP2010-91282A, there is disclosed a sound-source search device configured to detect a location of generation of a noise propagated inside a cabin of a vehicle. In the sound-source search device disclosed in this Japanese Patent Application Publication, sound data is generated by collecting the noise, and the sound data is analyzed whereby the location of generation of the noise is specified.

SUMMARY OF THE INVENTION

By the way, where the sound source causing the noise is to be specified by using the sound-source search device as disclosed in the above-identified Japanese Patent Application Publication, an accuracy of presuming the sound source by the sound-source search device is reduced with increase of a distance of the sound-source search device from a propagation path of the noise, so that presuming the sound source is difficult when the distance is large. It might be possible to pre-extract a sound-source candidate that is a candidate of the sound source causing the noise. However, where the sound-source candidate is intended to be extracted by using a vibration sensor or a microphone, an extractable range is limited so that there is a problem that the sound-source candidate cannot be easily extracted.

The present invention was made in view of the background art described above. It is therefore an object of the present invention to provide a sound-source-candidate extraction system for extracting a candidate of a sound source that causes a noise propagated inside or outside a cabin of a vehicle, and also a sound-source search method using the sound-source-candidate extraction system.

The object indicated above is achieved according to the following aspects of the present invention.

According to a first aspect of the invention, there is provided a sound-source-candidate extraction system for extracting a candidate of a sound source that causes a noise propagated inside or outside a cabin of a vehicle, the sound-source-candidate extraction system comprising: (a) an imaging device configured to acquire data of an image inside or outside the cabin of the vehicle; and (b) an extracting device configured to extract the candidate of the sound source, depending on a difference between first and second image data acquired by the imaging device, wherein the first image data is the data of the image before generation of the noise, and the second image data is the data of the image upon or after the generation of the noise.

According to a second aspect of the invention, in the sound-source-candidate extraction system according to the first aspect of the invention, a vehicle-change-event storing portion is configured to store therein a history of vehicle change events including an image-detected change event that was detected in the data of the image, wherein the extracting device is configured, in a case in which the image-detected change event occurred after the first image data was acquired by the imaging device and before the second image data was acquired by the imaging device, to extract, as the candidate of the sound source, a part changed by the image-detected change event that caused the difference between the first and second image data.

According to a third aspect of the invention, in the sound-source-candidate extraction system according to the second aspect of the invention, the history of the vehicle change events stored in the vehicle-change-event storing portion includes, in addition to the image-detected change event, a recorded change event that was recognized without depending on the data of the image and recorded in the history of the vehicle change events.

According to a fourth aspect of the invention, there is provided a sound-source search method of searching a sound source that causes a noise propagated inside or outside a cabin of a vehicle, by using a sound-source-candidate extraction system including (i) an imaging device configured to acquire data of an image inside or outside the cabin of the vehicle, and (ii) an extracting device configured to extract a candidate of the sound source, depending on a difference between first and second image data, wherein the first image data is the data of the image acquired by the imaging device before generation of the noise, and the second image data is the data of the image acquired by the imaging device upon or after the generation of the noise, the sound-source search method comprising: (a) causing the sound-source-candidate extraction system to extract the candidate of the sound source; and (b) causing an acquiring device to acquire vibration data or sound data of the extracted candidate of the sound source.

In the sound-source-candidate extraction system according to any one of the first through third aspects of the invention, the candidate of the sound source is extracted depending on the difference between first and second image data acquired by the imaging device, wherein the first image data is the data of the image before generation of the noise, and the second image data is the data of the image upon or after the generation of the noise. Thus, it is possible to easily extract the candidate of the sound source.

In the sound-source search method according to the fourth aspect of the invention, the sound-source-candidate extraction system is caused to extract the candidate of the sound source, depending on the difference between first and second image data, whereby the candidate of the sound source is easily extracted. Further, the acquiring device is caused to acquire the vibration data or the sound data of the extracted candidate of the sound source that causes the noise, and the sound source is presumed based on the acquired vibration data or sound data of the extracted candidate of the sound source, so that it is possible to improve an accuracy of presuming the sound source, without increasing burden to an inspector who performs a sound-source searching operation

BRIEF DESCRIPTION OF THE DRAWINGS

FIG. 6 is a view showing a history of vehicle change events, which is updated each time when a vehicle change event is detected based on an image analysis;

DETAILED DESCRIPTION OF PREFERRED EMBODIMENTS

Hereinafter, there will be described preferred embodiments in detail with reference to the accompanying drawings. It is noted that the figures of the drawings are simplified or deformed as needed, and each portion is not necessarily precisely depicted in terms of dimension ratio, shape, etc.

First Embodiment

Figure 1:
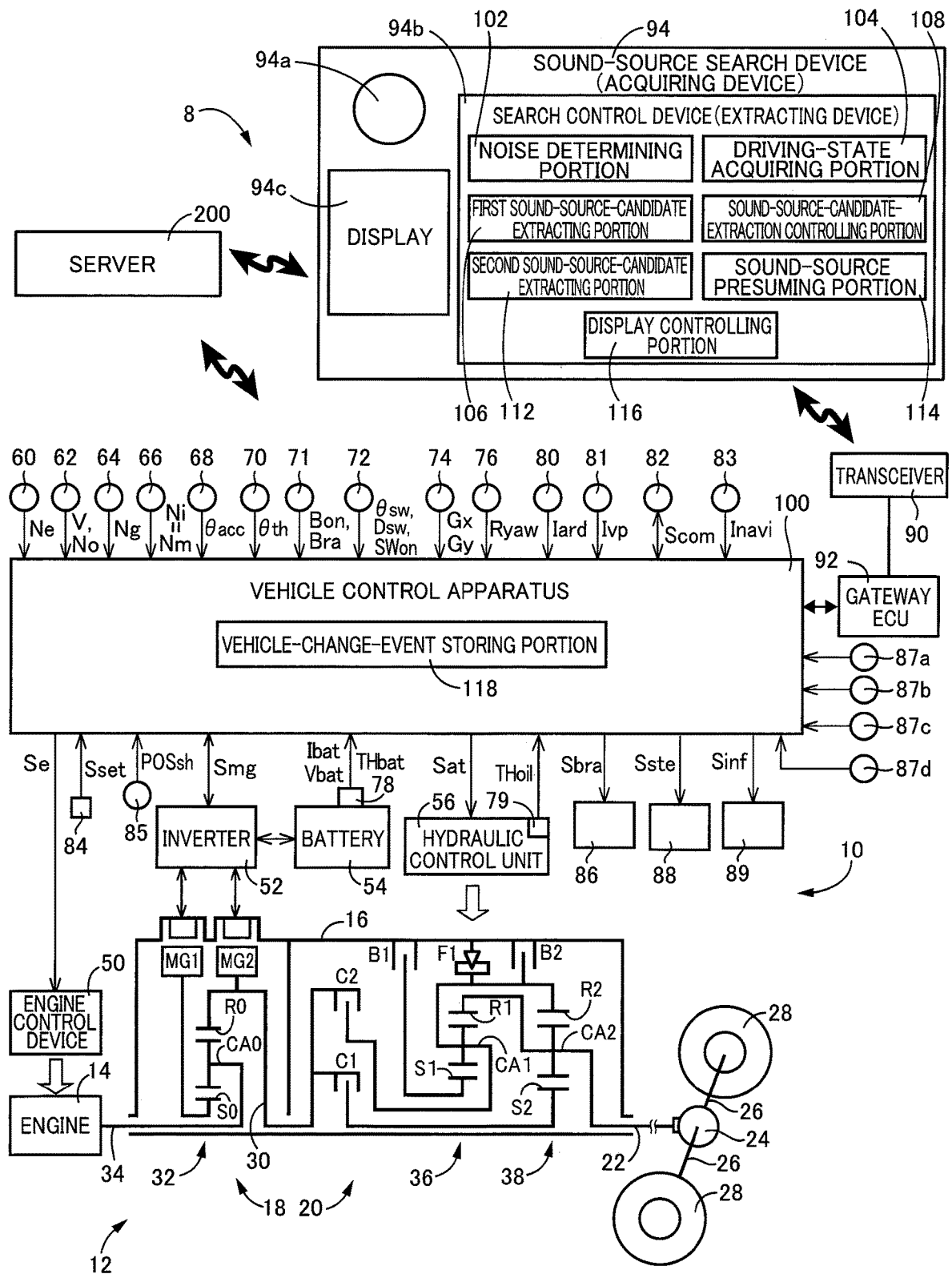
FIG. 1 is a view schematically showing a construction of a vehicle to which the present invention is applied, and also a construction of a sound-source search system for searching a noise-causing sound source that causes a noise propagated inside a cabin of the vehicle.

FIG. 1 is a view schematically showing a construction of a vehicle 10 to which the present invention is applied, and also a construction of a sound-source search system 8 for searching a sound source that causes a noise propagated inside or outside a cabin of the vehicle 10.

The vehicle 10 includes an engine 14, a first rotating machine MG1 and a second rotating machine MG2, and is a hybrid electric vehicle in which the engine 14 and the second rotating machine MG2 serve as drive power sources for driving the vehicle 10. The vehicle 10 further includes a power transmission apparatus 12 that constitutes a drive-power transmission path between the engine 14 and drive wheels 28. The power transmission apparatus 12 includes a casing 16 as a non-rotary member, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The power transmission apparatus 12 further includes a differential gear device 24 connected to an output shaft 22 that is an output rotary member of the step-variable transmission portion 20, and a pair of axles 26 connected to the differential gear device 24.

In the power transmission apparatus 12, the drive power outputted from the engine 14 or the second rotating machine MG2 is transmitted to the step-variable transmission portion 20, and is then transmitted from the step-variable transmission portion 20 to the drive wheels 28 of the vehicle 10, for example, through the differential gear device 24. It is noted that the power corresponds to a torque or a force unless otherwise distinguished from them. It is also noted that the power transmission apparatus 12 including the continuously-variable transmission portion 18 and the step-variable transmission portion 20 is constructed substantially symmetrically about its axis corresponding to the above-described common axis, so that a lower half of the power transmission apparatus 12 is not shown in FIG. 1.

The engine 14 serves as the drive power source capable of generating a drive torque, and is a known internal combustion engine such as gasoline engine and diesel engine. The vehicle 10 is provided with an engine control device 50 that includes a throttle actuator, a fuel injection device and an ignition device. With the engine control device 50 being controlled, an engine torque Te, which is an output torque of the engine 14, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by a vehicle control apparatus 100 whereby an MG1 torque Tg and an MG2 torque Tm as output torques of the respective first and second rotating machines MG1, MG2 are controlled.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmitting member 30 that is an output rotary member of the continuously-variable transmission portion 18; and a second rotating machine (second motor/generator) MG2 connected to the intermediate transmitting member 30 in a drive-force transmittable manner. The differential mechanism 32 is constituted by a planetary gear device of a single-pinion type having a sun gear S0, a carrier CA0 and a ring gear R0. The carrier CA0 is connected to the engine 14 through a connecting shaft 34 in a drive-force transmittable manner, and the sun gear S0 is connected to the first rotating machine MG1 in a drive-force transmittable manner, while the ring gear RO is connected to the second rotating machine MG2 in a drive-force transmittable manner. The continuously-variable transmission portion 18 is an electrically-controlled continuously-variable transmission wherein a differential state of the differential mechanism 32 is controllable by controlling an operation state of the first rotating machine MG1.

The step-variable transmission portion 20 is a mechanically-operated transmission mechanism which constitutes a part of a drive-power transmitting path between the continuously-variable transmission portion 18 and the drive wheels 28. The step-variable transmission portion 20 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as "engagement devices CB" unless otherwise specified. Each of the engagement devices CB receives an engagement hydraulic pressure PRcb that is controlled by a hydraulic control unit 56 provided in the vehicle 10. When a gear position is selected, based on an accelerator operation amount (accelerator opening degree θacc) and a running speed V of the vehicle 10, for example, so as to be established in the step-variable transmission portion 20, operation states of the respective engagement devices CB are controlled such that corresponding at least one of the engagement devices CB is engaged for establishing the selected gear position.

Referring back to FIG. 1, the vehicle 10 is provided with the vehicle control apparatus 100 as a controller including control devices which are configured to control, for example, the engine 14, continuously-variable transmission portion 18 and step-variable transmission portion 20. For example, the vehicle control apparatus 100 includes a so-called microcomputer incorporating a CPU, a RAM, a ROM and an input-output interface. The CPU performs control operations of the vehicle 10, by processing various input signals, according to control programs stored in the ROM, while utilizing a temporary data storage function of the RAM. The vehicle control apparatus 100 may be constituted by two or more control units exclusively assigned to perform different control operations such as the engine control operation and the shift control operation.

The vehicle control apparatus 100 receives various input signals based on values detected by respective sensors provided in the vehicle 10. Specifically, the vehicle control apparatus 100 receives: an output signal of an engine speed sensor 60 indicative of an engine rotational speed Ne which is a rotational speed of the engine 14; an output signal of an output speed sensor 62 indicative of an output-shaft rotational speed No which is a rotational speed of the output shaft 22 and which corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of an MG2 rotational speed Nm which is a rotational speed of the second rotating machine MG2 and which corresponds to an AT input rotational speed Ni; an output signal of an accelerator-opening degree sensor 68 indicative of an acceleration opening degree θacc representing an amount of accelerating operation made by the vehicle driver; an output signal of a throttle-opening degree sensor 70 indicative of a throttle opening degree θth; an output signal of a brake pedal sensor 71 indicative of a brake-ON signal Bon representing a state of depression of a brake pedal by the vehicle driver to operate wheel brakes and also a braking operation amount Bra representing an amount of depression of the brake pedal by the vehicle driver corresponding to a depressing force applied to the brake pedal; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current Ibat and a voltage Vbat of the battery 54; an output signal of a fluid temperature sensor 79 indicative of a working fluid temperature THoil that is a temperature of a working fluid supplied to a hydraulic actuator of each of the engagement devices CB so as to operate each of the engagement devices CB; an output signal of a vehicle-area information sensor 80 indicative of vehicle area information Iard; an output signal of a vehicle location sensor 81 indicative of location information Ivp; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and a cruise control; and an output signal of a shift position sensor 85 indicative of an operation position POSsh of a shift lever provided in the vehicle 10.

The vehicle control apparatus 100 further receives image data (image information) supplied from first and second cameras 87a, 87b, wherein the first camera 87a is configured to capture an image inside the cabin of the vehicle 10 (hereinafter referred to as "vehicle cabin"), while the second camera 87b is configured to capture an image outside the vehicle cabin. The first camera 87a is provided on an upper side of a center mirror 96 (see FIGS. 5A and 5B), for example, and is capable of acquiring the data of the image inside the vehicle cabin. The second camera 87b is provide in an appropriate position, and is capable of acquiring the data of the image of an entirety or part of surroundings of the vehicle 10. The second camera 87b is constituted by a 360-degree camera or a plurality of camera units that are capable of capturing the image of the surroundings of the vehicle 10. Further, each of the first and second cameras 87a, 87b may be constituted by an onboard camera that constitutes also the vehicle-area information sensor 80. It is noted that each of the first and second cameras 87a, 87b corresponds to "imaging device" recited in the appended claims.

The vehicle-area information sensor 80 includes a lidar (Light Detection and Ranging), a radar (Radio Detection and Ranging) and/or the onboard camera, for example, so as to directly obtain information relating to a road on which the vehicle 10 is running and information relating to an object or objects present around the vehicle 10. The lidar is constituted by, for example, a plurality of lidar units configured to detect objects present in the respective front, lateral and rear sides of the vehicle 10, or a single lidar unit configured to detect objects present all around the vehicle 10. The lidar is configured to output, as the vehicle area information Iard, object information that is information relating to the detected object or objects. The radar is constituted by, for example, a plurality of radar units configured to detect objects present in the respective front, front vicinity and rear vicinity of the vehicle 10, and to output, as the vehicle area information Iard, object information that is information relating to the detected object or objects. The object information outputted as the vehicle area information Iard by the lidar and the radar includes a distance and a direction of each of the detected objects from the vehicle 10. The onboard camera is, for example, a monocular camera or a stereo camera configured to capture images of front and rear sides of the vehicle 10, and to output, as the vehicle area information Iard, captured image information that is information relating to the captured images. The captured image information outputted as the vehicle area information Iard by the onboard camera includes information relating to lanes of a running road, signs present on the running road, and at least one other vehicle (that is other than the vehicle 10), pedestrians and obstacles present on the running road.

The vehicle control apparatus 100 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; hydraulic control command signal Sat that is to be supplied to the hydraulic control unit 56 for controlling the operation states of the engagement devices CB; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 88, for controlling steering of wheels (especially, front wheels) of the vehicle 10; and an information-notification-control command signal Sinf that is to be supplied to an information notification device 89, for warning and notifying information to the vehicle driver.

The vehicle 10 further includes a transceiver 90 and a gateway ECU 92. The transceiver 90 is a device configured to communicate with a sound-source search device 94 and a server 200 that will be described below.

The gateway ECU 92 has substantially the same hardware construction as the vehicle control apparatus 100, and is constituted by, for example, a relay device provided to rewrite programs and/or data stored in the rewritable ROM included in the vehicle control apparatus 100. The gateway ECU 92 is connected to the transceiver 90, and is configured to receive and transmit various information between the vehicle control apparatus 100 and the sound-source search device 94, by using a wireless communication between the transceiver 90 and the sound-source search device 94. Further, the gateway ECU 92 is capable of receiving and transmitting the various information also between the vehicle control apparatus 100 and the server 200, by using a wireless communication between the transceiver 90 and the server 200.

The server 200 is a system present on a network outside the vehicle 10, and is configured to receive, process, analyze, store and supply the various information such as vehicle state information and vehicle phenomenon information, by using a wireless communication between the sound-source search device 94 and the vehicle control apparatus 100. The server 200 transmits and receives the various information to and from the sound-source search device 94 and the vehicle control apparatus 100. The vehicle state information represents, for example, an operation state or driving state related to driving of the vehicle 10, which is detected by the various sensors or the like. This operation state or driving state (hereinafter simply referred to as "driving state") is represented, for example, by the accelerator operation degree θacc and the vehicle running speed V. The vehicle state information is transmitted to the server 200, for example, via the gateway ECU 92. The vehicle phenomenon information represents, for example, phenomenons caused in the vehicle 10. These phenomenons are, for example, a sound pressure SP which is detected by a sound-pressure detection portion 94a and which represents a level of a sound inside the vehicle cabin, and also a vibration which is detected by the G sensor 74 and which is felt by the vehicle driver and passengers. It is noted that the vehicle state information may be transmitted to the server 200, via the external-network communication antenna 82 through the wireless communication.

The sound-source search device 94 has functions of collecting a sound inside the vehicle cabin, and searching the sound source (hereinafter referred to as "noise-causing sound source") that causes the noise, based on sound data acquired based on the collected sound. The specific functions of the sound-source search device 94 will be described below.

The vehicle control apparatus 100 executes various control operations. For example, the vehicle control apparatus 100 determines a shifting action of the step-variable transmission portion 20, by using, for example, an AT gear position shift map (not shown), which is a prestored relationship obtained by experimentation or determined by an appropriate design theory, and executes the shift control operation in the step-variable transmission portion 20 as needed. The AT gear position shifting map is a predetermined relationship between two variables in the form of the vehicle running speed V and the required drive force Frdem, for example, which relationship is used to determine the shifting action of the step-variable transmission portion 20 and is represented by shifting lines in two-dimensional coordinates in which the running speed V and the required drive force Frdem are taken along respective two axes.

The vehicle control apparatus 100 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The vehicle control apparatus 100 calculates a drive request amount in the form of the required drive force Frdem that is to be applied to the drive wheels 28, by applying the accelerator opening degree θacc and the vehicle running speed V to, for example, a drive request amount map that is a predetermined relationship. As the drive request amount, a required drive torque Trdem [Nm] applied to the drive wheels 28, a required drive power Prdem [W] applied to the drive wheels 28 and a required AT output torque applied to the output shaft 22 can be used as well as the required drive force Frdem [N].

For example, when the continuously-variable transmission portion 18 is operated as a continuously variable transmission, the vehicle control apparatus 100 controls the engine 14 and controls a generated electric power Wg of the first rotating machine MG1 so as to attain the engine rotational speed Ne and the engine torque Te at which an engine power Pe achieving the required drive power Prdem is acquired in consideration of an engine optimum fuel consumption point etc., and thereby provides the continuously variable shift control of the continuously variable transmission portion 18 to change the gear ratio γ0 of the continuously variable transmission portion 18.

The vehicle control apparatus 100 selectively establishes the motor running mode or the hybrid running mode as the running mode depending on the driving state of the vehicle 10, so as to cause the vehicle 10 to run in a selected one of the running modes. For example, the vehicle control apparatus 100 establishes the motor running mode when the required drive power Prdem is in a motor running region smaller than a predetermined threshold value, and establishes the hybrid running mode when the required drive power Prdem is in a hybrid running region equal to or larger than the predetermined threshold value.

The vehicle control apparatus 100 is capable of executing, as a drive control for driving the vehicle 10, a selected one of a manual drive control for driving the vehicle 10 in accordance with driving operations made by the vehicle driver and an automatic drive control for automatically driving the vehicle 10 without depending on the driving operations made by the vehicle driver. In the automatic drive control, for example, the vehicle 10 is accelerated, decelerated, braked and steered, depending on a target driving state that is automatically determined based on, for example, a map information and a destination point inputted by the vehicle driver. When an automatic drive mode is selected with an automatic-drive selecting switch of the drive-assist setting switches 84 being placed in ON by the vehicle driver, the vehicle control apparatus 100 establishes the automatic drive mode so as to execute the automatic drive control.

By the way, if the noise is propagated into the vehicle cabin, the vehicle driver feels uncomfortable. Since it is necessary to locate the noise-causing sound source in order to eliminate the noise, the sound-source search system 8 described below is used to search the noise-causing sound source. The sound-source search system 8 has functions of extracting a sound-source candidate that is a candidate of the noise-causing sound source causing the noise propagated inside the vehicle cabin, and checking whether the extracted sound-source candidate is the noise-causing sound source, so as to presume the noise-causing sound source. The sound-source search system 8 includes the vehicle control apparatus 100, first and second cameras 87a, 87b, sound-source search device 94 and server 200, wherein the vehicle control apparatus 100 and first and second cameras 87a, 87b are provided in the vehicle 10 while each of the sound-source search device 94 and server 200 is an external device provided apart from the vehicle 10. It is noted that the sound-source search system 8, which has the function of extracting the sound-source candidate that is the candidate of the noise-causing sound source causing the noise propagated inside the vehicle cabin, corresponds to "sound-source-candidate extraction system" recited in the appended claims.

The sound-source search device 94 (hereinafter referred to as "search device 94") is provided with the above-described sound-pressure detection portion 94a that includes a microphone configured to detect the sound pressure SP; a search control device 94b configured to control operations of the sound-source search system 8 as a whole including the search device 94; and a display 94c configured to indicate an instruction for the inspector during search of the noise-causing sound source. The sound-pressure detection portion 94a functions as an acquiring device (sound collecting device) configured to collect the sound inside the vehicle cabin and to acquire the sound pressure SP as sound data. For searching the noise-causing sound source, the search control device 94b is a control device configured to execute various control operations for searching the noise-causing sound source, wherein the various control operations include a control operation for supplying an instruction to the inspector, a control operation for extracting the sound-source candidate that is likely to be the noise-causing sound source, and a control operation for presuming whether the sound-source candidate is the noise-causing sound source or not. The control operations of the search control device 94b will be described later. The display 94c functions as an informing device configured, when the noise-causing sound source is searched, to inform the inspector of various information such as sound-source candidates and a sound measuring position of the search device 94 which is dependent on each of the sound-source candidates, by indicating the sound-source candidates and the sound measuring position.

The search control device 94b, as well as the vehicle control apparatus 100, includes a so-called microcomputer incorporating a CPU, a RAM, a ROM and an input-output interface. The search control device 94b functionally includes: a noise determining means in the form of a noise determining portion 102; a driving-state acquiring means in the form of a driving-state acquiring portion 104; a first sound-source-candidate extracting means in the form of a first sound-source-candidate extracting portion 106; a sound-source-candidate-extraction controlling means in the form of a sound-source-candidate-extraction controlling portion 108; a second sound-source-candidate extracting means in the form of a second sound-source-candidate extracting portion 112; a sound-source presuming means in the form of a sound-source presuming portion 114; and a display controlling means in the form of a display controlling portion 116. There will be described control functions of these portions included in the search control device 94b. It is noted that the search control device 94b corresponds to "extracting device" recited in the appended claims.

The noise determining portion 102 determines whether the noise is generated or not during running of the vehicle 10, based on the sound data acquired based on the sound collected by the search device 94 or a microphone provided apart from the search device 94. A default position of the sound measuring position, in which the search device 94 or the microphone is to be installed for collecting the noise, is set to a position that makes it possible to detect various noises. It is noted that the sound measuring position does not necessarily have to be a single position but may be two or more positions, for enabling the various noises to be detected.

Figure 2:
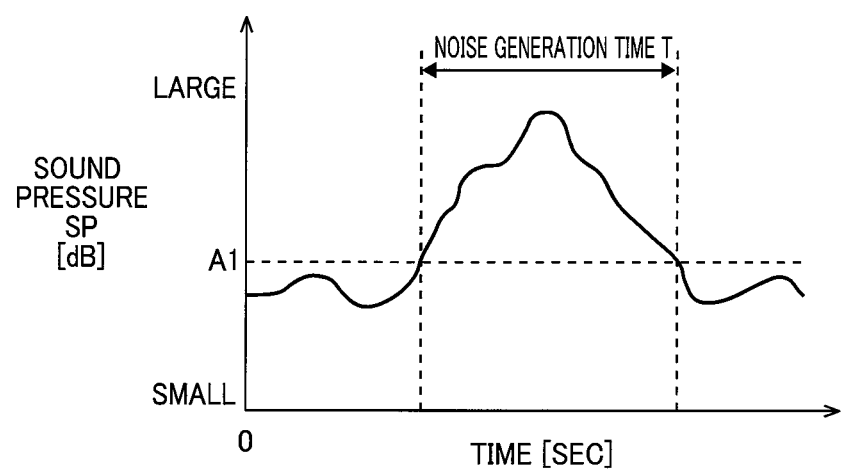
FIG. 2 is a view showing, by way of example, sound data when the noise is generated during running of the vehicle.

The noise determining portion 102 is configured, when the sound collecting by the search device 94 or the microphone has been completed, the sound data acquired based on the collected noise is analyzed, and it is determined whether there has been a time period when the sound pressure SP was not smaller than a predetermined value A1 during running of the vehicle 10. FIG. 2 shows, by way of example, a level of the sound pressure SP as the sound data acquired based on the sound collected during running of the vehicle 10. In FIG. 2, its horizontal axis represents a time during running of the vehicle 10, while its vertical axis represents the sound pressure SP. In the example shown in FIG. 2, the sound pressure SP is not smaller than the predetermined value A1 in a certain time period. When a state in which the sound pressure SP is not smaller than the predetermined value A1, as shown in FIG. 2, is detected, the noise determining portion 102 determines that the noise is generated. The predetermined value A1 is a prestored value, which is obtained by experimentation or determined by an appropriate design theory such that the vehicle driver feels uncomfortable even in presence of a background noise as long as the sound pressure SP is not smaller than the predetermined value A1.

On the other hand, when the sound pressure SP has not been at least the predetermined value A1, namely, when the sound pressure SP has been always smaller than the predetermined value A1, as a result of analysis of the sound data based on the sound collected during running of the vehicle 10, it is determined that the noise is not generated. In this instance, the noise determining portion 102 supplies, to the display controlling portion 116, a command requesting the display 94c to indicate that the noise is not generated. When receiving the command, the display controlling portion 116 causes the display 94c to indicate that the noise has not been generated. The display controlling portion 116 is a control portion configured to control a display operation of the display 94c of the search device 94, and to supply, to the display 94c, an indication in accordance with commands supplied from various control portions such as the noise determining portion 102.

The noise determining portion 102 determines that the noise has been generated, not only based on the sound data acquired based on the sound collected during running of the vehicle 10. That is, the noise determining portion 102 can determine that the noise has been generated also when receiving, from an user (vehicle driver), an indication (noise information) that the noise has been generated in a certain driving state.

The driving-state acquiring portion 104 has a function of acquiring the driving state upon generation of the noise. When the noise is being collected and the sound pressure SP being measured, the driving-state acquiring portion 104 constantly stores therein the driving state of the vehicle 10 through the wireless communication via the transceiver 90, for example, from the vehicle control apparatus 100. In the present embodiment, the running speed V and the accelerator opening degree $\theta acc$ are constantly stored or updated as values related to the driving state of the vehicle 10. Further, when the noise is detected during collection of the sound, the driving-state acquiring portion 104 acquires the driving state (i.e., the running speed V and accelerator opening degree $\theta acc$) in a time period T (see FIG. 2) in which the noise is generated. In this instance, the output rotational speed No may be acquired in place of the running speed V, and the throttle-valve opening degree $\theta th$ or required drive force Frdem may be acquired in place of the accelerator opening degree $\theta acc$.

Figure 3:
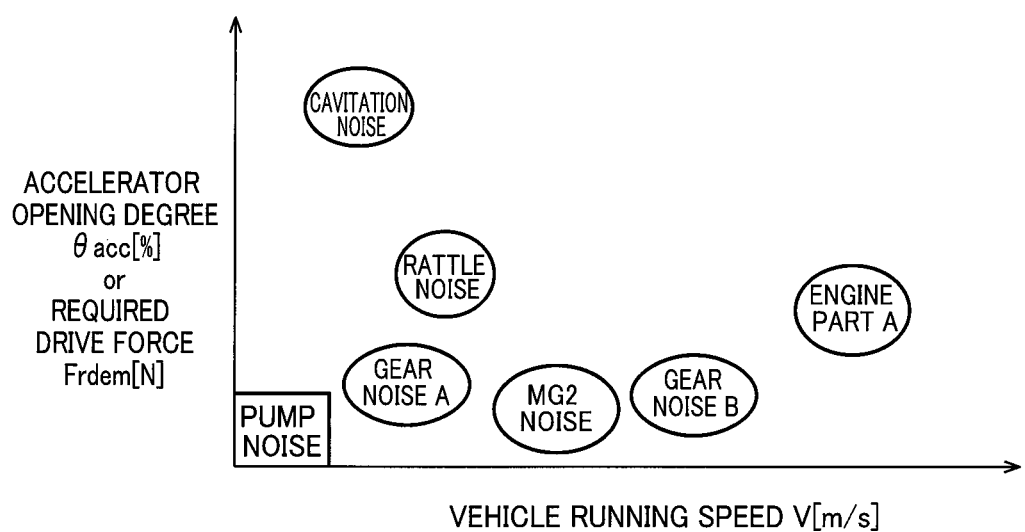
FIG. 3 is a view showing, by way of example, a sound-source candidate map that is to be used for extracting a sound-source candidate or candidates.

The first sound-source candidate extracting portion 106 extracts a sound-source candidate that is a candidate of the noise-causing sound source, based on the acquired driving state. In this instance, the first sound-source candidate extracting portion 106 extracts the sound-source candidate, by applying the acquired driving state to a sound-source candidate map shown in FIG. 3. FIG. 3 is a view showing, by way of example, the sound-source candidate map that is to be used for extracting the sound-source candidate, based on the acquired driving state. In FIG. 3, its horizontal axis represents the running speed V while its vertical axis represents the accelerator opening degree $\theta acc$ (or the required drive force Frdem). As shown in FIG. 3, a plurality of sound-source candidates are defined in the map, wherein each of the sound-source candidates is to be extracted depending on the driving state that is defined by a combination of the running speed V and the accelerator opening degree $\theta acc$ (or the required drive force Frdem).

For example, when the driving state upon generation of the noise is that the running speed V is low and the accelerator opening degree $\theta acc$ is low, a pump noise is extracted as the sound-source candidate from the sound-source candidate map of FIG. 3. When the driving state upon generation of the noise is that the running speed V is relatively high and the accelerator opening degree $\theta acc$ is low, a gear noise B is extracted as the sound-source candidate from the sound-source candidate map of FIG. 3. It is noted that, even when the driving state upon generation of the noise is deviated from one of the sound-source candidates in the sound-source candidate map of FIG. 3, if the deviation is so small that the driving state is close to the one of the sound-source candidates, the one of the sound-source candidates may be extracted as the sound-source candidate. Where two or more of the sound-source candidates could be the noise-causing sound source so as to be extracted, one of the extracted sound-source candidates having the highest probability is set to a first candidate, and another one of the extracted sound-source candidates having the second highest probability is set to a second candidate. That is, the plurality of extracted sound-source candidates are ranked in accordance with a degree of the probability. For example, when the driving state upon generation of the noise is within a driving state range of one of the extracted sound-source candidates and is close to the driving state range of another one of the extracted sound-source candidates, the one of the extracted sound-source candidates is set to the first candidate, and the other one of the extracted sound-source candidates is set to the second candidate. The driving sate range of each of the sound-source candidates is defined by a corresponding rectangular or circle in the sound-source candidate map of FIG. 3.

The sound-source candidate map of FIG. 3 is obtained by experimentation or determined by an appropriate design theory, for each of various types of vehicles or various types of drive systems. The sound-source candidate maps for the various types are stored in the search control device 94b of the search device 94 as in the present embodiment, or in the server 200, such that the stored maps are sorted depending on the type of vehicle or drive system. Where the sound-source candidate maps for the various types are stored in the server 200, one of the maps, which corresponds to the vehicle 10, may be referred through the wireless communication, as needed, when the sound-source candidate is to be extracted. Further, when the sound-source candidate maps have been updated to new maps, the new maps may be transmitted from the server 200 to the search control device 94b through the wireless communication, so that the sound-source candidate maps stored in the search control device 94b can be updated to the new maps.

When extracting the sound-source candidate or candidates, the first sound-source-candidate extracting portion 106 determines that at least one sound-source candidate is extractable. On the other hand, when any sound-source candidate cannot be extracted, namely, when there is found no sound-source candidate corresponding to the driving state of the vehicle 10, in the sound-source candidate map of FIG. 3, the first sound-source-candidate extracting portion 106 determines that the extraction of the sound-source candidate is difficult.

There will be described a process of searching the noise-causing sound source in a case in which the sound-source candidate is extracted based on the sound-source candidate map of FIG. 3, namely, based on the driving state of the vehicle 10. When the sound-source candidate has been extracted based on the sound-source candidate map, the sound-source-candidate-extraction controlling portion 108 determines a sound measuring position that is dependent on the extracted sound-source candidate. The sound-source-candidate-extraction controlling portion 108 stores therein a measuring position map defining the sound measuring position of the search device 94 which is dependent on the extracted sound-source candidate, and determines the sound measuring position, based on the stored measuring position map. When the sound measuring position has been determined based on the measuring position map, the display controlling portion 116 causes the display 94c of the search device 94 to indicate the determined sound measuring position, and informs the inspector of instructions to install the search device 94 in the determined sound measuring position so as to collect the sound inside the vehicle cabin. Following the instructions informed by the display 94c, the inspector installs the search device 94 in the sound measuring position and then collects the sound (measures the sound pressure SP) inside the vehicle cabin so as to acquire the sound data.

Figure 4:
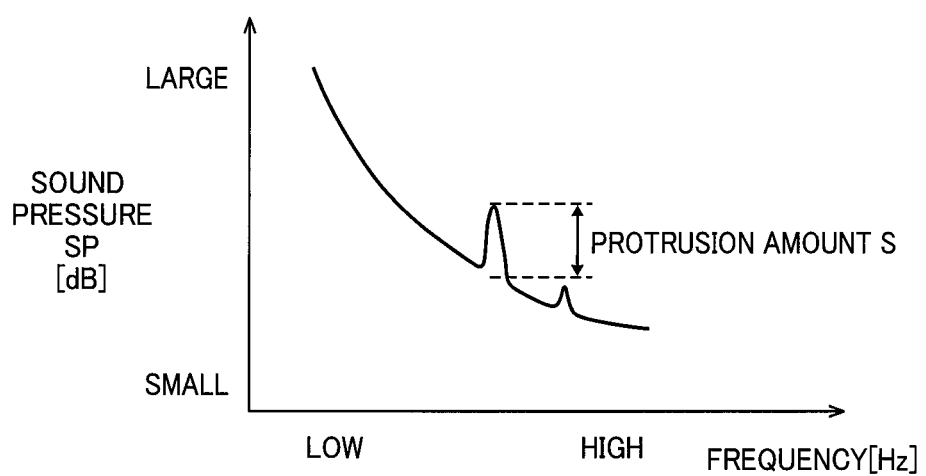
FIG. 4 is a view showing a relationship between a frequency and a sound pressure when the noise is generated.

The measuring position map is obtained by experimentation or determined by an appropriate design theory, such that the sound measuring position, which is defined for each of the sound-source candidates, is set to a position in which, when the noise is generated from the sound-source candidate that is likely to be the noise-making sound source, an amount S of protrusion (hereinafter referred to as "protrusion amount S") of the sound pressure SP becomes not smaller than a predetermined value in a certain frequency range. The certain frequency range is a frequency range in which the noise is to be generated when the sound-source candidate is the noise-causing sound source. Thus, the sound-source-candidate-extraction controlling portion 108 determines that the possibility that the sound-source candidate is the noise-causing sound source is high, when the protrusion amount S (see FIG. 4) of the sound pressure SP has become not smaller than the predetermined value in the above-described certain frequency range, based on the sound data acquired based on the sound collected by the search device 94 installed in the determined sound measuring position. FIG. 4 shows, by way of example, a noise characteristic. In FIG. 4, its horizontal axis represents the frequency [Hz], and its vertical axis represents the sound pressure SP [dB]. As shown in FIG. 4, the sound pressure SP is increased by the protrusion amount S in the certain frequency range, and the sound based on the protrusion amount S is transmitted as the noise to the vehicle driver. The above-described predetermined value, which is used for the determination as to whether the sound-source candidate is the noise-causing sound source or not, is a smallest value which makes the vehicle driver perceive the noise during running of the vehicle 10 and which is obtained by experimentation or determined by an appropriate design theory. This predetermined value may be changed as needed depending on the sound-source candidate and the frequency range.

On the other hand, the sound-source-candidate-extraction controlling portion 108 determines that the possibility that the sound-source candidate is the noise-causing sound source is low, when the protrusion amount S of the sound pressure SP has been smaller than the predetermined value even in the above-described certain frequency range, based on the sound data acquired based on the sound collected by the search device 94 installed in the determined sound measuring position. In this instance, where there is another sound-source candidate that is likely to be the noise-causing sound source, it is determined whether the possibility that the other sound-source candidate is the noise-causing sound source is high or not, in substantially the same manner as describe above.

The sound measuring position is not limited to a single position, but two or more positions may be set as the sound measuring position. For example, where two measuring positions, i.e., first and second measuring positions are set as the sound measuring position, the first measuring position is set to a position in which the protrusion amount S of the sound pressure SP is to be not smaller than the predetermined value when the noise is generated from the sound-source candidate, and the second measuring position is set to a position which is distant from the first measuring position by a predetermined distance and in which the protrusion amount S of the sound pressure SP is to be smaller than in the first measuring position by a predetermined difference value when the noise is generated from the sound-source candidate. Therefore, it is determined that the possibility that the sound-source candidate is the noise-causing sound source is high, in a case in which the protrusion amount S of the sound pressure SP measured when the search device 94 is installed in the second measuring position is smaller by the predetermined difference value, than that measured when the search device 94 is installed in the first measuring position. Thus, with a plurality of measuring positions being set as the sound measuring position, the accuracy of presuming the sound-source candidate is further increased.

When it is determined that the possibility that the sound-source candidate is the noise-causing sound source is high, the sound-source-candidate-extraction controlling portion 108 supplies, to the display controlling portion 116, a command requesting the display 94c to indicate that the sound-source candidate is presumed as the noise-causing sound source, so as to inform the inspector that the sound-source candidate is presumed as the noise-causing sound source.

There will be next described a case in which no sound-source candidate has been extracted based on the driving state of the vehicle 10. The vehicle control apparatus 10 provided in the vehicle 10 functionally includes a vehicle-change-event storing means in the form of a vehicle-change-event storing portion 118. The vehicle-change-event storing portion 118 constantly acquires data of the images inside and outside the vehicle cabin, by using the first and second cameras 87a, 87b, and analyzes the acquired data of the images. When detecting a change, i.e., a difference between the currently acquired image data and the previously acquired image data, as a result of analysis of the acquired image data, the vehicle-change-event storing portion 118 stores therein the detected change (i.e., detected difference) as the vehicle change event. That is, the vehicle-change-event storing portion 118 detects the change based on the analysis of the acquired image data, which is made by an AI of the vehicle control apparatus 100, and stores therein the detected change as the vehicle change event.

Figure 5A:
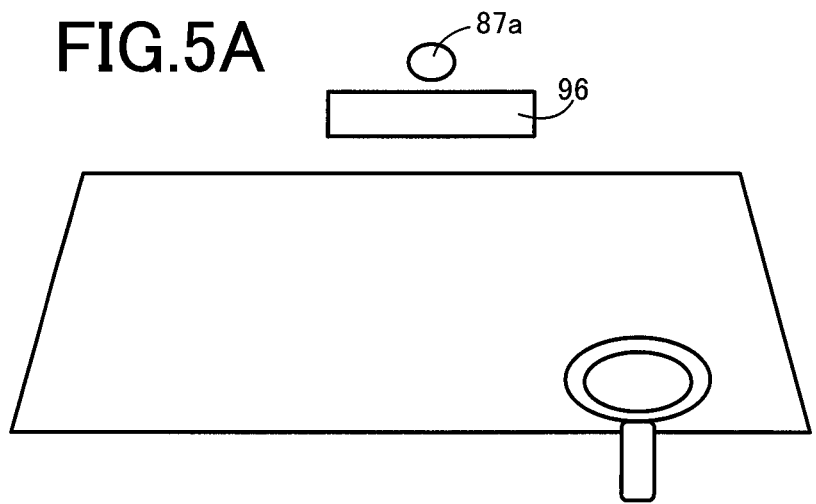
FIGS. 5A and 5B are views each showing, in a simplified manner, an image inside the vehicle cabin, which is captured by a first camera provided on an upper side of a center mirror in the vehicle cabin.
Figure 5B:
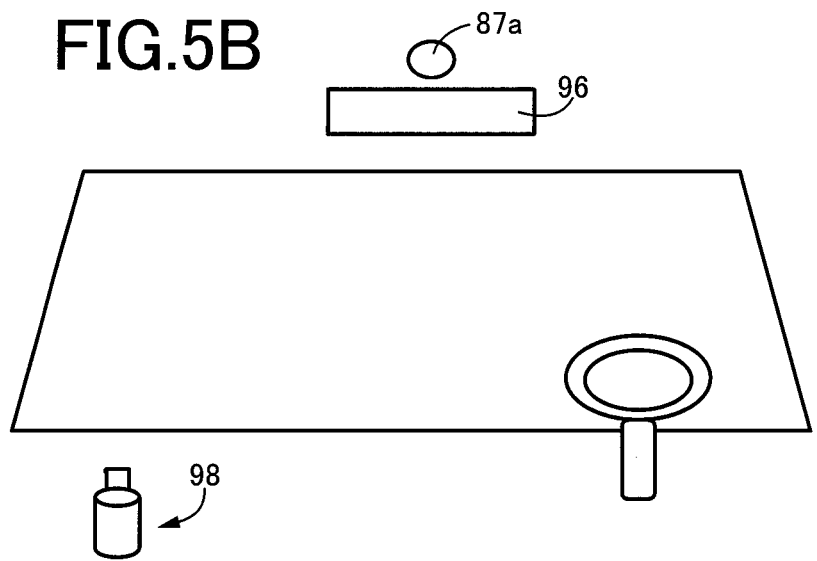

FIGS. 5A and 5B are views each showing, in a simplified manner, an example of the image inside the vehicle cabin, which is acquired by the first camera 87a provided on an upper side of the center mirror 96 in the vehicle cabin. FIG. 5A shows the image inside the vehicle cabin, which has been captured by the first camera 87a at a certain point of time. FIG. 5B shows the image inside the vehicle cabin, which has been captured by the first camera 87a after the image of FIG. 5A has been captured and after a cup holder 98 has been attached onto a side of a passenger seat in the vehicle cabin.

When the cup holder 98 is attached onto the side of the passenger seat after data of the image shown in FIG. 5A has been acquired, the vehicle-change-event storing portion 118 detects the change caused in the vehicle cabin and acquires data of the image shown in FIG. 5B. Further, the vehicle-change-event storing portion 118 makes an image analysis of the data of the image before the change, which is shown in FIG. 5A and the data of the image after the change, which is shown in FIG. 5B, and detects the change so as to store therein the change as the vehicle change event. For example, in the image shown in FIG. 5B, the cup holder 98, which is not shown in the image shown in FIG. 5A, is shown, so that the vehicle-change-event storing portion 118 recognizes the change, i.e., difference between the image of FIG. 5A and the image of FIG. 5B, and stores therein the attachment of the cup holder 98 as the vehicle change event causing the change in the vehicle cabin.

FIG. 6 is a view showing a history of the vehicle change events, which is updated each time when the vehicle change event is detected based on the image analysis. Each time when the vehicle change event is newly detected, the newly detected vehicle change event is added to the history, with its identification number (hereinafter referred to as "event number"), its date on which the vehicle change event was detected, its specific content of the vehicle change event and its subject that caused the vehicle change event, and the thus updated history is stored. Each of the vehicle change events of the history shown in FIG. 6 is stored based on the analysis made by the AI or based on an operation history in a vehicle dealer. For example, when an accessory is attached, the attachment of the accessory is detected as the vehicle change event by the AI, and the event number (10010), the date (2025.10.1) on which the vehicle change event occurred, the specific content of the vehicle change event (attachment of the accessory) and the subject (user) are stored, as shown in the top in FIG. 6. In this example, the accessory corresponds to a part changed by the attachment of the accessory as the vehicle change event (image-detected change event). Further, for example, when a wiper rubber is replaced by a vehicle dealer, the replacement of the wiper rubber is recorded as the vehicle change event based on the operation history of the vehicle 10, and the event number (10202), the date (2025.12.5) on which the vehicle change event occurred, the specific content of the vehicle change event (replacement of the wiper rubber) and the subject (dealer) are recoded and stored, as shown third from the top in FIG. 6. In this example, the wiper rubber corresponds to a part changed by the replacement of the wiper rubber as the vehicle change event (recorded change event). Still further, when a left-side mirror is partially deformed by an accident, the partial deformation of the left-side mirror is recorded as the vehicle change event based on an accident history, and the event number (11402), the date (2026.2.3) on which the vehicle change event occurred, the specific content of the vehicle change event (partial deformation of the left-side mirror) and the subject (accident) are recorded stored, as shown fifth from the top in FIG. 6. In this example, the left-side mirror corresponds to a part changed by the partial deformation of the left-side mirror as the vehicle change event (recorded change event). It is noted that each of the attachment of the accessory and the attachment of the cup holder corresponds to "image-detected change event" recited in the appended claims, and that each of the replacement of the wiper rubber and the partial deformation of the left-side mirror corresponds to "recorded change event" recited in the appended claims.

The second sound-source-candidate extracting portion 112 extracts the sound-source candidate, based on the image data acquired by the first and second cameras 87a, 87b before generation of the noise and also the image data acquired by the first and second cameras 87a, 87b upon or after the generation of the noise, namely, depending on the change (namely, a part changed by the vehicle change event), i.e., the difference between the image data acquired before the generation of the noise and the image data acquired upon or after the generation of the noise. Specifically, the second sound-source-candidate extracting portion 112 refers to the history of the vehicle change events, and sets a part changed by the vehicle change event, which is detected as the change shortly before the generation of the noise, as the sound-source candidate.

For example, in a case in which the noise was not yet generated when the image shown in FIG. 5A was captured and then the noise was generated when or after the image shown in GIG. 5B was captured, it is considered that there is a possibility that the noise was generated by the cup holder 98 attached after the image of FIG. 5A was captured, namely, there is a possibility that the attached cup holder 98 is the noise-causing sound source. In this instance, the second sound-source-candidate extracting portion 112 extracts, as the sound-source candidate, the attached cup holder 98 that corresponds to a part changed by the vehicle change event (image-detected change event) that caused the difference between the image data (data of the image shown in FIG. 5A) acquired before the generation of the noise and the image data (data of the image shown in FIG. 5B) acquired upon or after the generation of the noise. Thus, the second sound-source-candidate extracting portion 112 extracts the sound-source candidate, based on the image data (data of the image shown in FIG. 5A) acquired before the generation of the noise and the image data (data of the image shown in FIG. 5B) acquired upon or after the generation of the noise, namely, depending on the change, i.e., the difference between the image data acquired before the generation of the noise and the image data acquired upon or after the generation of the noise.

Further, the second sound-source-candidate extracting portion 112 ranks the vehicle change events that were detected or stored before the generation of the noise, with reference to the history of the vehicle change events. Specifically, the second sound-source-candidate extracting portion 112 ranks the vehicle change events stored before the noise generation, such that one of them, which was stored at a point of time closer to a point of time of the generation of the noise, is given a higher rank than the others, namely, such that one of them, which was stored more later, is given a higher rank than the others. Therefore, one of the vehicle change events stored before the noise generation, which was stored at a point of time closest to the point of time of the generation of the noise, is selected, and a part changed by the selected one of the vehicle change events is set to the first candidate. Then, another one of the vehicle change events stored before the noise generation, which was stored at a point of time second closest to the point of time of the generation of the noise, is selected, and a part changed by the selected other one of the vehicle change events is set to the second candidate. It is noted that the data of the image before the noise generation, which is shown in FIG. 5A, corresponds to "first image data" recited in the appended claims, and the data of the image upon or after the noise generation, which is shown in FIG. 5B, corresponds to "second image data" recited in the appended claims.

When the first candidate has been set by the second sound-source-candidate extracting portion 112, the sound-source presuming portion 114 determines whether a possibility that the first candidate is the noise-causing sound source is high or not. Firstly, the sound-source presuming portion 114 determines whether the first candidate is a deformation or shape change caused inside or outside the vehicle cabin. The sound-source presuming portion 114 determines whether the change is a shape change caused inside or outside the vehicle cabin, based on the vehicle change event that has been set as the first candidate. When the vehicle change event as the first candidate is a shape change such as a body dent caused by an accident, for example, the sound-source presuming portion 114 determines that the first candidate is a shape change.

In this instance, the sound-source presuming portion 114 determines whether the possibility that the first candidate is the noise-causing sound source is high or not, depending on whether the noise is generated from a shape changed part in which the shape change was caused. The sound-source presuming portion 114 supplies, to the display controlling portion 116, a command requesting the display 94c to indicate an instruction for checking whether the noise is generated from the shape changed part or not. Following the instruction indicated in the display 94c, the inspector checks whether the noise is generated from the shape changed part or not. The inspector acquires the sound data, for example, by collecting the sound through the sound-pressure detection portion 94a or the microphone that is installed in the vicinity of the shape changed part. It is noted that the search device 94 (particularly, the sound-pressure detection portion 94a) or the microphone corresponds to "acquiring device (caused to acquire the sound data)" recited in the appended claims.

The sound-source presuming portion 114 determines whether the noise is generated or not, based on the acquired sound data. When the protrusion amount S of the sound pressure SP exceeds the predetermined value in the certain frequency range in the acquired sound data, the sound-source presuming portion 114 determines that the noise is generated from the shape changed part and that the possibility that the shape change caused in the shape changed part is the noise-causing sound source is high. In this instance, the sound-source presuming portion 114 supplies, to the display controlling portion 116, a command requesting the display 94c to indicate that the first candidate (shape change) is presumed as the noise-causing sound source. On the other hand, when the noise is not detected from the acquired sound data, the sound-source presuming portion 114 determines that the possibility that the first candidate is the noise-causing sound source is low. In this instance, the sound-source presuming portion 114 ranks the second candidate up to the first candidate, namely, sets the second candidate as the new first candidate, and supplies, to the display controlling portion 116, a command requesting the display 94c to indicate an instruction for checking whether the noise is generated from the new first candidate, so as to instruct the inspector to check whether the new first candidate is the noise-causing sound source or not.

Further, when the first candidate is not a shape change, the sound-source presuming portion 114 determines whether the possibility that the first candidate is the noise-causing sound source is high or not, depending on whether the noise is detected or not in a state in which a part corresponding to the first candidate is removed or replaced. For example, when the first candidate is the cup holder 98 that is removable or replaceable, the sound-source presuming portion 114 supplies, to the display controlling portion 116, a command requesting the display 94c to indicate an instruction for checking whether the noise is generated in a state in which the cup holder 98 is removed or replaced by another cup holder. Following the instruction indicated in the display 94c, the inspector collects the sound by the search device 94 or the microphone after the cup holder 94 has been removed or replaced by another cup holder. The sound-source presuming portion 114 determines that the possibility that the attached cup holder 98 is the noise-causing sound source is high, when the noise is not detected based on the sound data acquired based on the collected sound in the state in which the cup holder 98 is removed or replaced by another cup holder. This is because it is considered that the possibility that the attached cup holder 98 is the noise-causing sound source is high since the noise is not detected in the state in which the cup holder 98 is removed or replaced by another cup holder. In this instance, the display controlling portion 116 causes the display 94c to indicate that the attached cup holder 98 is presumed as noise-causing sound source. It is noted that the determination as to whether the noise is detected or not is made depending on whether the protrusion amount S of the sound pressure SP exceeds the predetermined value in a certain frequency range, as in the case in which the sound-source candidate is the shape change.

On the other hand, when the noise is detected even in the state in which the cup holder 98 is removed or replaced by another cup holder, the possibility that the attached cup holder 98 is the noise-causing sound source is low so that the sound-source presuming portion 114 determines that the possibility that the attached cup holder 98 is the noise-causing sound source is low. In this instance, the sound-source presuming portion 114 ranks the second candidate up to the first candidate, namely, sets the second candidate as the new first candidate, and supplies, to the display controlling portion 116, a command requesting the display 94c to indicate an instruction for checking whether the noise is generated from the new first candidate or not.

Further, when another part other than the cup holder 98 is the sound-source candidate, too, it is determined whether the possibility that the sound-source candidate is the noise-causing sound source is high or not, by checking whether the noise is generated or not in a state in which the other part is removed or replaced. For example, when the sound-source candidate is a wheel cap, it is determined whether the possibility that the wheel cap as the sound-source candidate is the noise-causing sound source is high or not, depending on whether the noise is detected or not during running of the vehicle 10 in a state in which the wheel cap is removed. Further, when the sound-source candidate is a newly replaced tire, the newly replaced tire is replaced by another tire so as to determine whether a possibility that the newly replaced tire is the noise-causing sound source is high or not, by checking whether the noise is generated or not during running of the vehicle 10 with the other tire by which the newly replaced tire has been replaced. Still further, when the sound-source candidate is a newly replaced battery, the newly replaced battery is replaced by another battery so as to determine whether a possibility that the newly replaced battery is the noise-causing sound source is high or not, by checking whether the noise is generated or not during running of the vehicle 10 with the other battery by which the newly replaced battery has been replaced.

In a case in which a mark could be undesirably left if a part such as the cup holder 98 is removed, it is possible to check whether the noise is generated or not, without the part being removed, by using the search device 94. For example, when the attached cup holder 98 is extracted as the first candidate and is preferably not removed, the sound-source presuming portion 114 sets the first measuring position to a position close to the cup holder 98 and sets the second measuring position to a position distant from the first measuring position by a certain distance. The display controlling portion 116 causes the display 94*c* to indicate the first and second measuring positions dependent on the sound-source candidate, so as to inform the inspector to install the search device 94 in these positions and collect the sound (measure the sound pressure SP). The first measuring position is a position in which the protrusion amount S of the sound pressure SP is estimated to exceed the predetermined value when the sound-source candidate is the noise noise-causing sound source. The second measuring position, which is distant from the first measuring position by the certain distance, is a position in which the protrusion amount S of the sound pressure SP is estimated to be smaller than in the first measuring position by the predetermined difference value when the same sound-source candidate is the noise noise-causing sound source.

Figure 7:
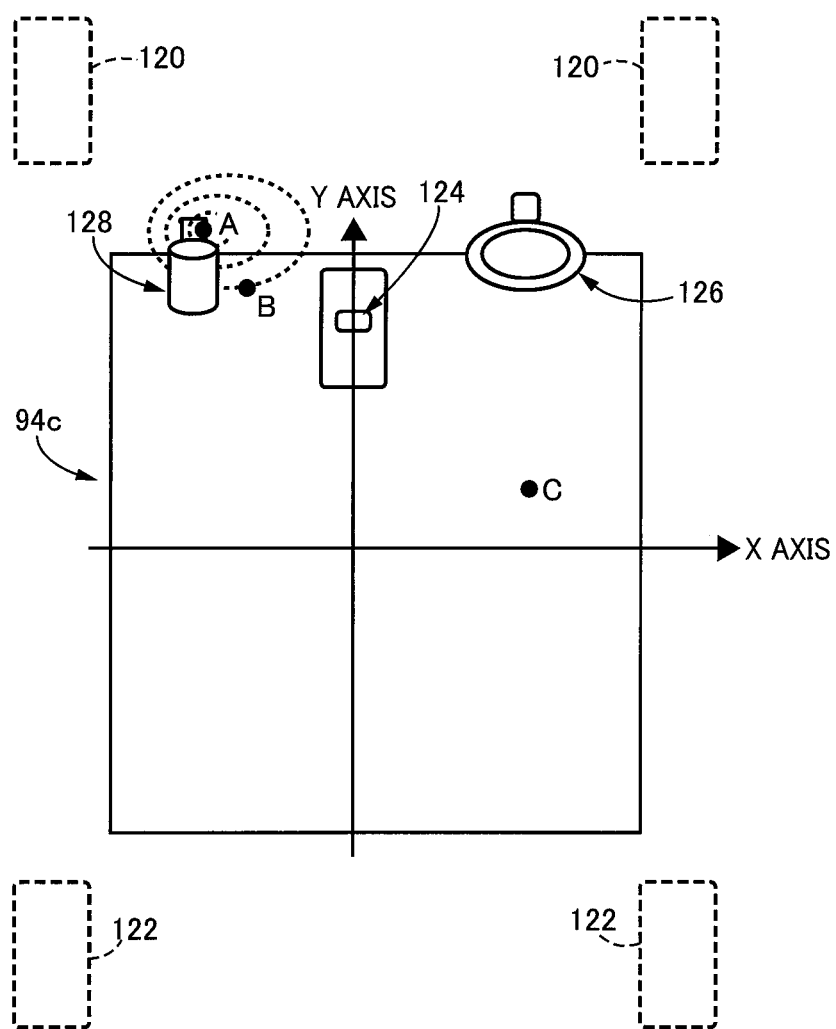
FIG. 7 is an image which is displayed in a display of a search device and which schematically shows an interior of the vehicle cabin.

FIG. 7 is the image displayed in the display 94*c* of the search device 94 and schematically showing the interior of the vehicle cabin. In FIG. 7, a part surrounded by a rectangle of a solid line corresponds to the interior of the vehicle cabin. Further, in FIG. 7, broken lines provided in an upper-side portion of the drawing sheet represent imaginary front wheels 120, and broken lines provided in a lower-side portion of the drawing sheet represent imaginary rear wheels 122. In the display 94*c*, the interior of the vehicle cabin is represented in two dimensional manner, and an imaginary shift lever 124 corresponding to the shift lever and an imaginary steering wheel 126 corresponding to the steering wheel are shown. Further, FIG. 7 shows an imaginary cup holder 128 indicating the cup holder 98 as the first candidate. In FIG. 7, a position A and a position B correspond to the first and second measuring positions, respectively, which are dependent on the cup holder 98 as the first candidate.

The display controlling portion 116 causes the display 94*c* to indicate the position A corresponding to the first measuring position, and informs the inspector to install the search device 94 in the position A so as to collect and measure the sound in the position A. Following the instruction indicated in the display 94*c*, the inspector installs the search device 94 in the position A and measures the sound. When the sound collection has been completed in the position A, the display controlling portion 116 causes the display 94*c* to indicate the position B corresponding to the second measuring position, and informs the inspector to install the search device 94 in the position B so as to collect and measure the sound in the position B. Following the instruction indicated in the display 94*c*, the inspector installs the search device 94 in the position B and measures the sound.

When the sound collection has been completed with the search device 94 being installed in both of the first and second measuring positions, the sound-source presuming portion 114 determines whether the possibility that the first candidate is the noise-causing sound source is high or not, based on the sound data acquired based on the measured sound. The sound-source presuming portion 114 determines that the possibility that the first candidate is the noise-causing sound source is high, in a case in which the protrusion amount S of the sound pressure SP is not smaller than the predetermined value in the certain frequency range when being measured with the search device 94 being installed in the position A corresponding to the first measuring position, and in which the protrusion amount S of the sound pressure SP is smaller by the predetermined difference value in the certain frequency range when being measured with the search device 94 being installed in the position B corresponding to the second measuring position, than when being measured with the search device 94 being installed in the position A. In this case, the display controlling portion 116 causes the display 94*c* to indicate that the first candidate is presumed as the noise-causing sound source, so as to inform the inspector that the first is presumed as the noise-causing sound source.

On the other hand, the sound-source presuming portion 114 determines that the possibility that the first candidate is the noise-causing sound source is low, in a case in which the protrusion amount S of the sound pressure SP is larger when being measured with the search device 94 being installed in the second measuring position, than when being measured with the search device 94 being installed in the first measuring position, or other cases in which the result of measurement is different from that in the above-described case that enables the presumption that the first candidate is presumed as the noise-causing sound source. In this case, the sound-source presuming portion 114 ranks the second candidate up to the first candidate, namely, sets the second candidate as the new first candidate, and supplies, to the display controlling portion 116, a command requesting the display 94*c* to indicate an instruction for checking whether the noise is generated from the new first candidate, so as to inform the inspector to check whether the new first candidate is the noise-causing sound source or not.

There has been described the arrangement in which the noise is intended to be detected directly by the search device 94 or the microphone. However, it is also possible to employ an arrangement in which generation of the noise is detected indirectly by measuring vibration of a part corresponding to the first candidate. For example, the vibration of the part as the first candidate may be measured by a vibration sensor, and it can be determined whether the noise is generated or not, depending on whether the part is vibrated or not. Further, a high-speed camera 87*c* (see FIG. 1) may be provided inside the vehicle cabin, so that the vibration of the part can be measured based on image data acquired by the high-speed camera 87*c* (see FIG. 1), for detecting the generation of the noise, based on a magnitude of the vibration. Or alternatively, an acoustic camera 87*d* (see FIG. 1) may be provided inside the vehicle cabin, so that the generation of the noise can be detected based on data acquired through the acoustic camera 87*d*. Where the high-speed camera 87*c* or the acoustic camera 87*d* is used, each of these cameras 87*c*, 87*d* corresponds to "acquiring device" recited in the appended claims.

Figure 8:
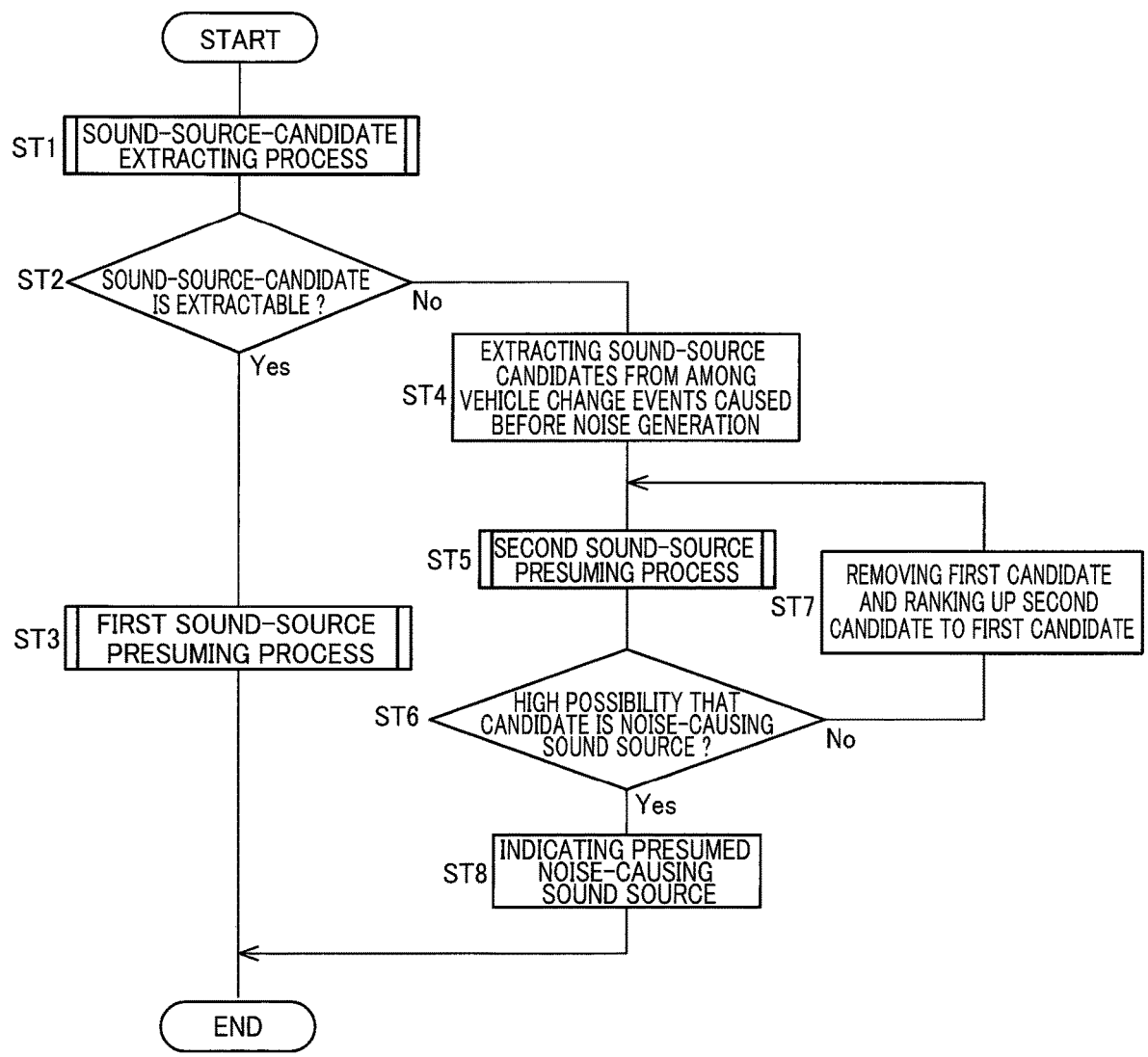
FIG. 8 is a flow chart for explaining a control routine that is to be executed in an inspection process in which the noise-causing sound source (causing the noise propagated inside the vehicle cabin) is searched by using the sound-source search system, namely, for explaining a sound-source search method of searching the noise-causing sound source.

FIG. 8 is a flow chart for explaining a control routine that is to be executed in an inspection process in which the noise-causing sound source (causing the noise propagated inside the vehicle cabin) is searched by using the sound-source search system 8, namely, for explaining a sound-source search method of searching the noise-causing sound source.

Figure 9:
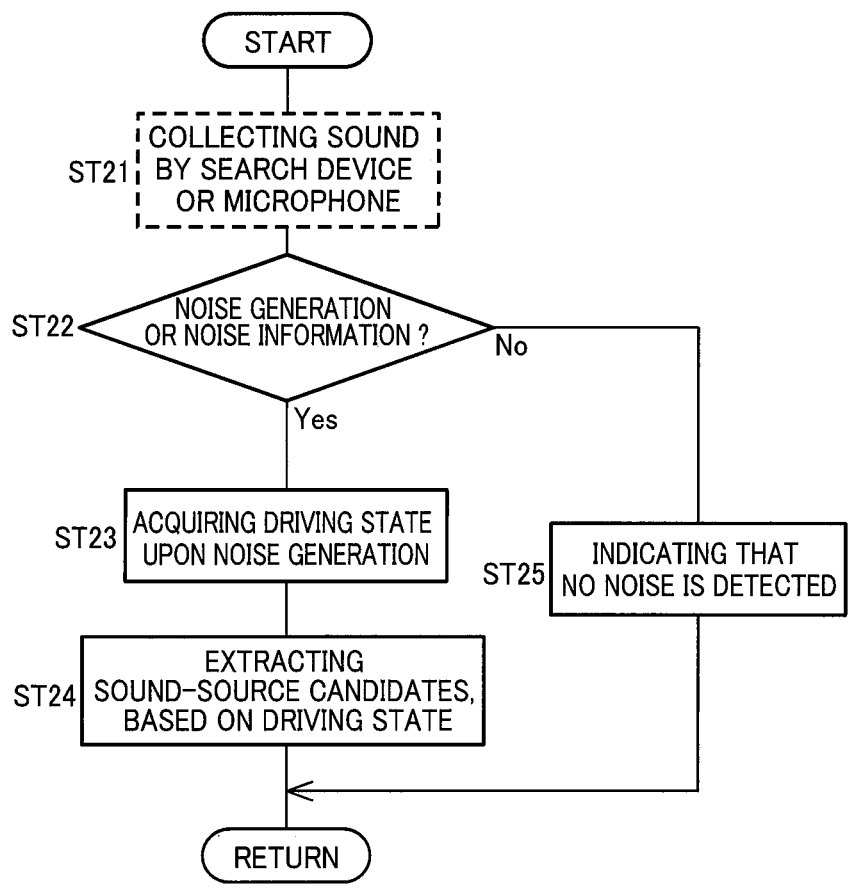
FIG. 9 is a flow chart for explaining a control routine that is to be executed for extracting the sound-source candidate or candidates, based on a driving state of the vehicle.

The control routine is initiated with step ST1 corresponding to a sound-source-candidate extracting process executed to extract sound-source candidate or candidates each of which is likely to be the noise-causing sound source. The sound-source-candidate extracting process as the step ST1 will be described with reference to a flow chart of FIG. 9. In FIG. 9, step ST21, which is surrounded by broken line, is a step implemented by operation executed by the inspector, and steps ST22-ST25 are control steps executed by the search control device 94*b*.

In FIG. 9, ST21 is implemented to collect the sound with use of the search device 94 or other microphone during running or stop (idling) of the vehicle 10. Step ST21 is followed by ST22 corresponding to control function of the noise determining portion 102, which is implemented to determine whether the noise has been detected based on the sound data acquired based on the collected sound, or whether there has been received, from the user, an indication (noise information) that the noise has been generated. When a negative determination is made at step ST22, the control flow goes to step ST25 corresponding to control function of the display controlling portion 116, which is implemented to cause the display 94c of the search device 94 to indicate that the noise has not been detected. After implementation of step ST25, one cycle of execution of the control routine is terminated, without implementation of step ST2 and the subsequent steps shown in FIG. 8. When an affirmative determination is made at step ST22, step ST23 corresponding to control function of the driving-state acquiring portion 104 is implemented to acquire the driving state (running speed V, accelerator opening degree θacc) upon generation of the noise. Then, at step ST24 corresponding to control function of the sound-source candidate extracting portion 106, the sound-source candidate or candidates are extracted by applying the driving state acquired at step ST23, to the sound-source candidate map of FIG. 3. After implementation of step ST24, the control flow goes back to the control routine of FIG. 8, whereby step ST2 and the subsequent steps are implemented.

Referring back to FIG. 8, at step ST2 corresponding to control function of the first sound-source-candidate extracting portion 106, it is determined whether at least one sound-source candidate has been extractable or not, depending on whether at least one sound-source candidate has been extracted or not at step ST1. When at least one sound-source candidate has been extracted at step ST1, an affirmative determination is made at step ST2 whereby the control flow goes to step ST3. On the other hand, when at least one sound-source candidate has not been extracted, namely, when no sound-source candidate corresponding to the driving state of the vehicle 10 in the sound-source candidate map (see FIG. 3) has been found, a negative determination is made at step ST2 whereby the control flow goes to step ST4.

Figure 10:
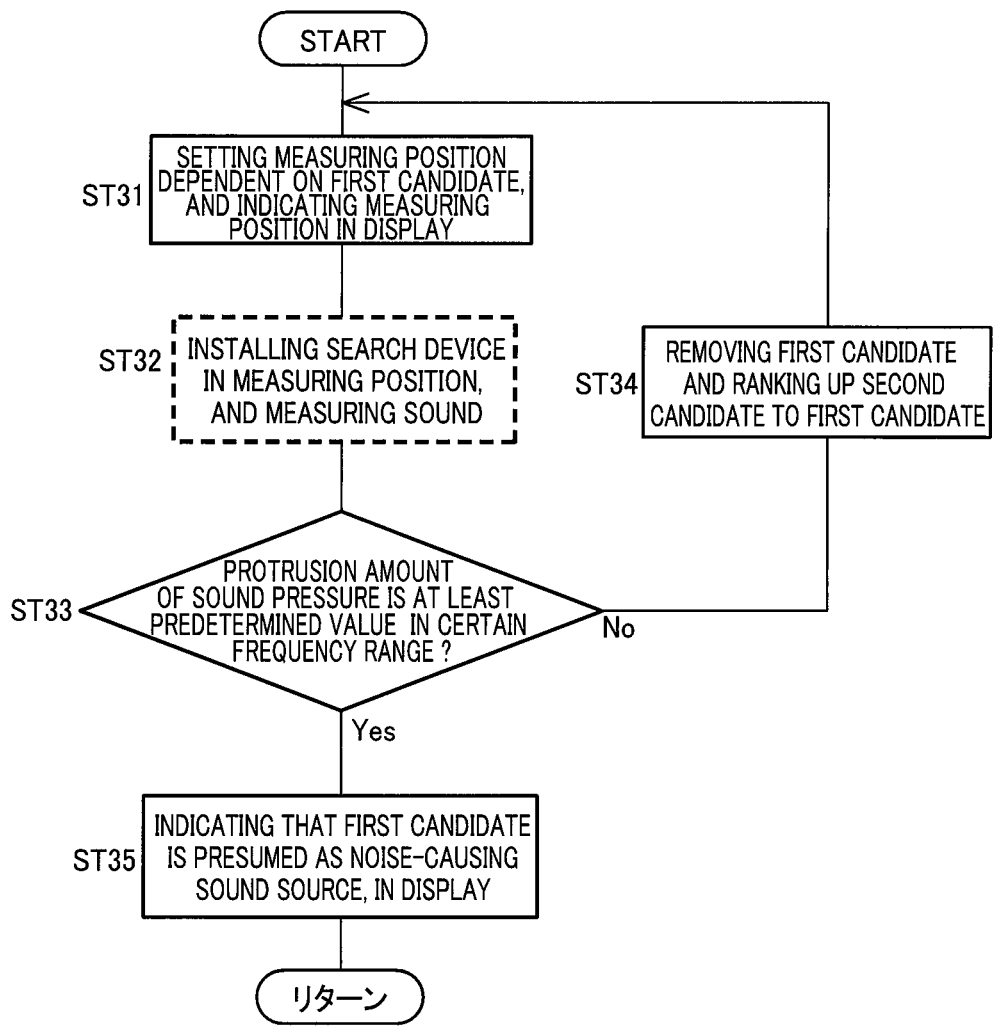
FIG. 10 is a flow chart for explaining a control routine that is to be executed for presuming whether the sound-source candidates extracted based on the driving state, is the noise-causing sound source or not.

At step ST3 corresponding to a first sound-source presuming process, it is presumed whether each of the extracted sound-source candidates is the noise-causing sound source or not. The first sound-source presuming process as the step ST3 will be described with reference to a flow chart of FIG. 10. In FIG. 10, step ST32, which is surrounded by broken line, is a step implemented by operation executed by the inspector, and steps ST31 and ST33-ST35 are control steps executed by the search control device 94b.

At step ST31 corresponding to control functions of the sound-source-candidate-extraction controlling portion 108 and the display controlling portion 116, the sound measuring position is set to a position dependent on the first candidate, and the sound measuring position is indicated in the display 94c. Step ST32 is followed by step ST32 at which the search device 94 is installed in the sound measuring position by the inspector, and the sound is collected and measured with the search device 94 being installed in the sound measuring position. Then, at step ST33 corresponding to control function of the sound-source-candidate-extraction controlling portion 108, it is determined whether the sound-source candidate is presumed as the noise-causing sound source or not, depending on whether the protrusion amount S of the sound pressure SP is at least the predetermined value or not in the certain frequency range in which the noise is to be generated when the sound-source candidate is the noise-causing sound source. When the protrusion amount S of the sound pressure SP is the predetermined value or more, the sound-source candidate is presumed as the noise-causing sound source and the control flow goes to step ST35. When the protrusion amount S of the sound pressure SP is smaller than the predetermined value, it is determined that the possibility that the sound-source candidate is the noise-causing sound source is low and the control flow goes to step ST34. It is noted that, when the first and second measuring positions are set as the sound measuring position that is dependent on the sound-source candidate, it is determined whether the sound-source candidate is presumed as the noise-causing sound source or not, based on the result of the measurement made when the search device 94 is installed in the first measuring position and also the result of the measurement made when the search device 94 is installed in the second measuring position.

At step ST34 corresponding to control function of the sound-source-candidate-extraction controlling portion 108, the sound-source candidate extracted as the second candidate is ranked up to the first candidate, and step ST31 and the subsequent steps are implemented for the new first candidate. At step ST35 corresponding to control function of the display controlling portion 116, it is indicated in the display 94c that the first candidate is presumed as the noise-causing sound source.

Referring back to FIG. 8, there will be described step ST4 and the subsequent steps that are to be implemented when no sound-source candidate has been extracted based on the driving state. At step ST4 corresponding to control function of the second sound-source-candidate extracting portion 112, the vehicle change event or events are selected from among the vehicle change events listed in the history shown in FIG. 6, which is stored for each vehicle and which is updated as needed, wherein the selected vehicle change event or events are an event or events detected or stored before the generation of the noise, and a part or parts changed by the selected vehicle change event or events are extracted as the sound-source candidate or candidates. Where two or more vehicle change events are selected, the vehicle change events are ranked such that one of them, which was stored at a point of time closer to a point of time of the generation of the noise, is given a higher rank than the others, namely, such that one of them, which was stored more later, is given a higher rank than the others. At step ST5 corresponding to a second sound-source presuming process, it is presumed whether the at least one sound-source candidate extracted at step ST4 is the noise-causing sound source or not. It is noted that step ST4 corresponds to "causing the sound-source-candidate extraction system to extract the candidate of the sound source", which is recited in the appended claims. The first sound-source presuming process as the step ST3 will be described with reference to a flow chart of FIG. 10. In FIG. 10, step ST32, which is surrounded by broken line, is a step implemented by operation executed by the inspector, and steps ST31 and ST33-ST35 are control steps executed by the search control device 94b.

Figure 11:
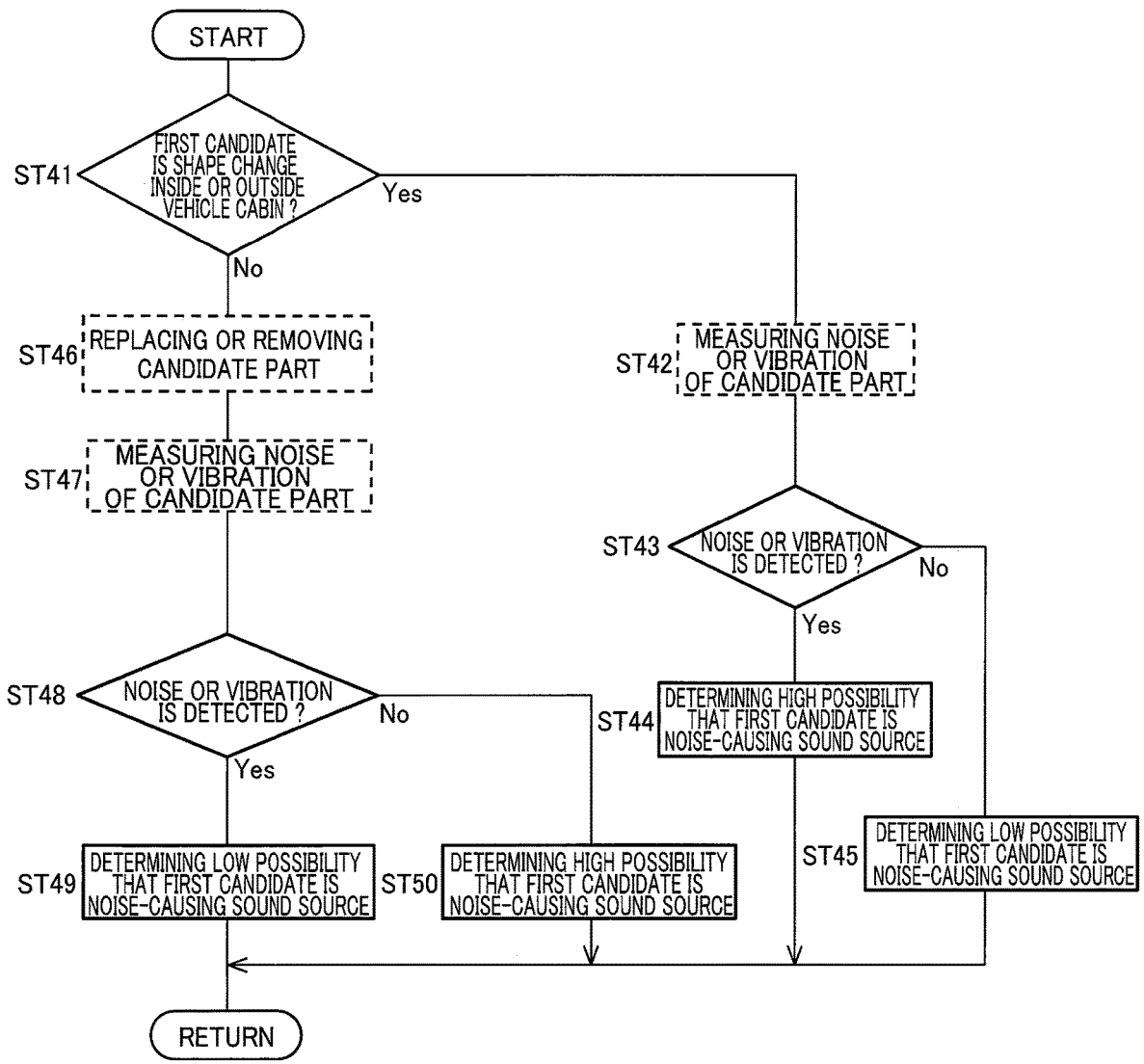
FIG. 11 is a flow chart for explaining a control routine that is to be executed for presuming whether the sound-source candidates extracted based on the history of the vehicle change events, is the noise-causing sound source or not.
Figure 12:
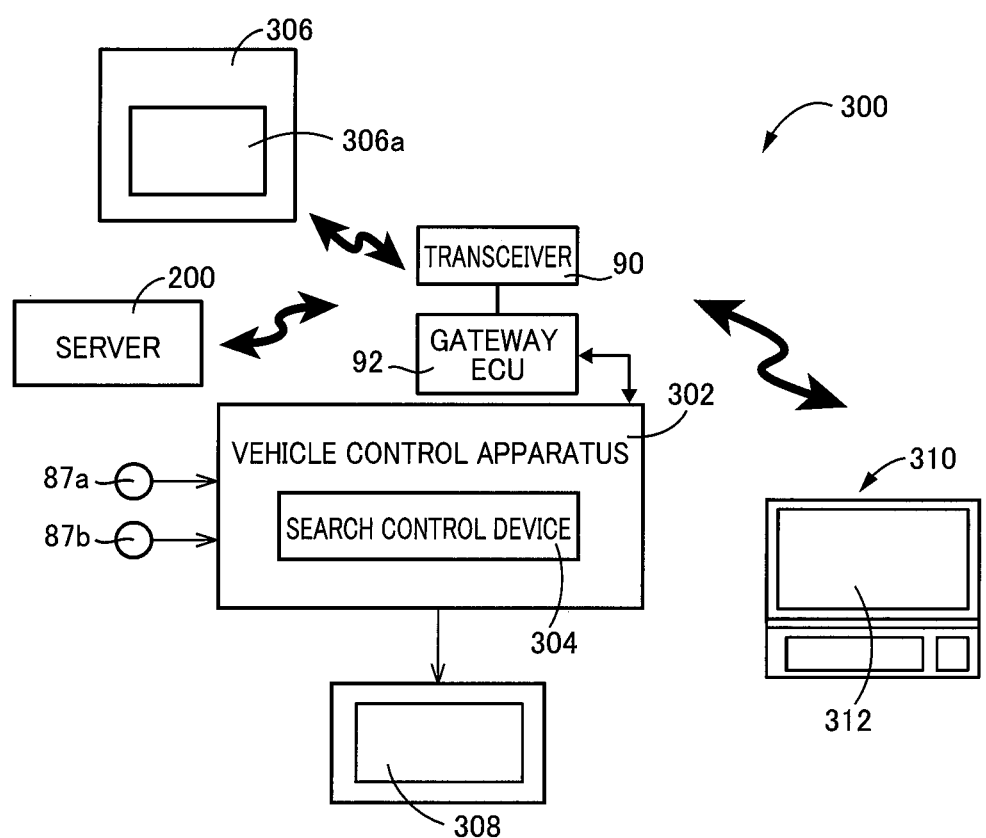
FIG. 12 is a view showing an overall construction of a sound-source search system according to another embodiment of the present invention.

The second sound-source presuming process as the step ST5 will be described with reference to a flow chart of FIG. 11. In FIG. 11, step ST42, ST46 and ST47, which are surrounded by broken lines, are steps implemented by operations executed by the inspector, and steps ST41, ST43-ST45 and ST48-ST50 are control steps executed by the search control device 94b. It is noted that each of steps ST42 and ST47 corresponds to "causing an acquiring device to acquire vibration data or sound data of the extracted candidate of the sound source".

At step ST41 corresponding to control function of the sound-source presuming portion 114, it is determined whether the extracted first candidate is a shape change caused inside or outside the vehicle 10, or not. When an affirmative determination is made at step ST41, the control flow goes to step ST42. When a negative determination is made at step ST41, the control flow goes to step ST46.

At step ST42, the noise or vibration generated from the shape changed part (in which the shape change was caused) is measured, for example, by using the search device 94, the microphone or the acoustic camera. Then, at step ST43 corresponding to control function of the sound-source presuming portion 114, it is determined whether the noise or vibration is detected or not, based on the result of the measurement of the noise or vibration made at step ST42. For example, when the protrusion amount S of the sound pressure SP or the magnitude of the vibration exceeds the predetermined value (threshold value), it is determined that the noise or vibration has been detected. When an affirmative determination is made at step ST43, step ST44 corresponding to control function of the sound-source presuming portion 114 is implemented to determine that the possibility that the first candidate is the noise-causing sound source is high, and the control flow goes back to the control routine shown by the flow chart of FIG. 8. When a negative determination is made at step ST43, step ST44 corresponding to control function of the sound-source presuming portion 114 is implemented to determine that the possibility that the first candidate is the noise-causing sound source is low, and the control flow goes back to the control routine shown by the flow chart of FIG. 8.

When a negative determination is made at step ST41, step ST46 is implemented to remove or replace the part that is the first candidate, and step ST47 is implemented to measure the noise or vibration in a state in which the part is removed or replaced, by using the search device 94, microphone or acoustic camera. Step ST47 is followed by step ST48 corresponding to control function of the sound-source presuming portion 114, which is implemented to determine whether the noise or vibration has been detected or not, based on the result of the measurement of the noise or vibration made at step S47. When the noise or vibration has been detected, an affirmative determination is made at step ST48 and it is determined that the possibility that the first candidate is the noise-causing sound source is low at step ST49 corresponding to control function of the sound-source presuming portion 114. This is because the noise or vibration is considered to be generated due to another factor, since the noise or vibration has been generated even in the state in which the part as the first candidate is removed or replaced by another part. On the other hand, when the noise or vibration has not been detected, a negative determination is made at step ST48 and it is determined that the possibility that the first candidate is the noise-causing sound source is high at step ST50 corresponding to control function of the sound-source presuming portion 114. This is because it is considered that the possibility that the first candidate is the noise-causing sound source is high, since the noise or vibration has not been generated in the state in which the part as the first candidate is removed or replaced by another part. After implementation of step ST49 or ST50, the control flow goes back to the control routine shown by the flow chart of FIG. 8.

Referring back to FIG. 8, at step ST6 corresponding to control function of the sound-source presuming portion 114, it is determined whether the possibility that the sound-source candidate is the noise-causing sound source has been presumed to be high or not at step ST5. When an affirmative determination is made at step ST6, step ST8 corresponding to control function of the display controlling portion 116 is implemented to cause the display 94 to indicate that the sound-source candidate is presumed as the noise-causing sound source. When a negative determination is made at step ST6, step ST7 corresponding to control function of the sound-source presuming portion 114 is implemented to rank the second candidate up to the first candidate, and the control flow goes back to step ST5 at which it is determined whether the new first candidate is presumed as the noise-causing sound source or not.

As described above, in the present embodiment, the sound source candidate is extracted depending on the change or difference between the first image data acquired by one of the first and second cameras 87a, 87b before generation of the noise and the second image data acquired by the one of the first and second cameras 87a, 87b upon or after the generation of the noise. Further, the vehicle-change-event storing portion 118 stores therein the history of vehicle change events including the image-detected change event (such as the attachment of the accessory and the attachment of the cup holder that are shown in FIG. 6) that was detected in the image data. In a case in which the image-detected change event occurred after the first image data was acquired and before the second image data was acquired, the search control device 94b extracts, as the sound source candidate, a part changed by the image-detected change event that caused the above-described difference between the first and second image data. Further, the history of the vehicle change events stored in the vehicle-change-event storing portion 118 includes, in addition to the image-detected change event, the recorded change event (such as the replacement of the wiper rubber and the partial deformation of the left-side mirror that are shown in FIG. 6) that was recognized without depending on the image data and recorded in the history of the vehicle change events. Thus, it is possible to easily extract the sound source candidate. Moreover, the sound-source search system 8 is caused to extract the sound source candidate, depending on the difference between first and second image data, whereby the sound source candidate is easily extracted. Further, the sound source is presumed based on the acquired vibration data or sound data of the extracted sound source candidate, so that it is possible to improve the accuracy of presuming the sound source, without increasing burden to the inspector who performs the sound-source searching operation.

There will be next described other embodiments. The same reference signs as used in the above-described first embodiment will be used in the following embodiments, to identify the functionally corresponding elements, and descriptions thereof are not provided.

Second Embodiment

FIG. 15 is a view showing an overall construction of a sound-source search system 300 according to this second embodiment of the present invention. In the present second embodiment, a vehicle control apparatus 302 provided in the vehicle 10 has a function of searing the noise-causing sound source. That is, the vehicle control apparatus 302 includes a search control device 304 having substantially the same function as the search control device 94b in the above-described first embodiment. The search control device 304 may be a device provided apart from a plurality of control devices constituting the vehicle control apparatus 302, wherein the plurality of control devices includes an engine-control control device configured to control the engine 14, or alternatively, may be constituted by one of the plurality of control devices.

In the present second embodiment, the sound-source search system 300 includes a sound-source search device 306, the vehicle control apparatus 302, a display 308 provided in the vehicle 10, the first and second cameras 87a, 87b and the server 200. The sound-source search device 306 (hereinafter referred to as "search device 306") has a function of measuring the sound pressure SP, but does not have other functions such as a function of extracting the sound-source candidates and a function of presuming whether each of the sound-source candidates is the noise-causing sound source or not. That is, the sound-source search device 306 functions exclusively as a sound collecting device configured to measure the sound pressure PS. The result of measurement made by the search device 306, i.e., the sound data, is transmitted to the vehicle control apparatus 302 provided in the vehicle 10, via the transceiver 90 and the gateway ECU 92. It is noted that the sound-source search system 300, search control device 304 and search device 306 correspond to "sound-source-candidate extraction system", "extracting device" and "acquiring device", respectively, which are recited in the appended claims.

Further, between the server 200 and the vehicle control apparatus 302, the information can be transmitted and received through the wireless communication via the transceiver 90 and the gateway ECU 92. For example, when the sound-source candidate map of FIG. 3 is updated, the updated map is transmitted from the server 200 to the vehicle control apparatus 302. Further, where the sound-source candidate map of FIG. 3 is stored in the server 200, when the noise-causing sound source is to be searched, the sound-source candidate map corresponding to the type and the drive system of the vehicle is transmitted from the server 200 so as to be referred. Further, where the history of the vehicle change event of each vehicle, which is shown in FIG. 6, is stored in the server 200, each time when the vehicle change event is detected, information related to the detected vehicle change event is transmitted to the server 200, whereby the history stored in the server 200 is updated. Where the sound-source candidate or candidates are to be extracted with reference to the history of vehicle change events, the history is transmitted from the server 200 to the vehicle control apparatus 302, so as to be referred to.

Further, in the present second embodiment, the search control device 304 has various control functions such as a function of extracting the sound-source candidates, based on the driving state, a function of extracting the sound-source candidates, based on the history of the vehicle change events and a function of presuming whether each of the sound-source candidates is the noise-causing sound source or not, so that the search control device 304 executes the various control operations. Further, the various information such as the extracted sound-source candidates and sound measuring positions, which are required for searching the noise-causing sound source, are indicated in the display 308 that is provided inside the vehicle cabin. That is, the various information are informed to the inspector through the display 308, so that the inspector can perform various processes, by seeing the indications shown in the display 308 provided in the vehicle 10. However, the various information required for searching the noise-causing sound source may be indicated in a display 306a provided in the search device 306, or in a display 312 provided in a mobile device 310 such as a personal computer which is carried by the inspector.

As described above, in the sound-source search system 300 according to the second embodiment, the inspector searches the noise-causing sound source, by seeing the indications shown in the display 308 provided in the vehicle 10, which are made based on the control operations performed by the search control device 304 of the vehicle control apparatus 302 provided in the vehicle 10. Thus, in the second embodiment, too, the noise-causing sound source can be presumed without increasing the burden to the inspector. The specific process of searching the noise-causing sound source is basically the same as in the above-described first embodiment, and accordingly is not described.

Third Embodiment

Figure 13:
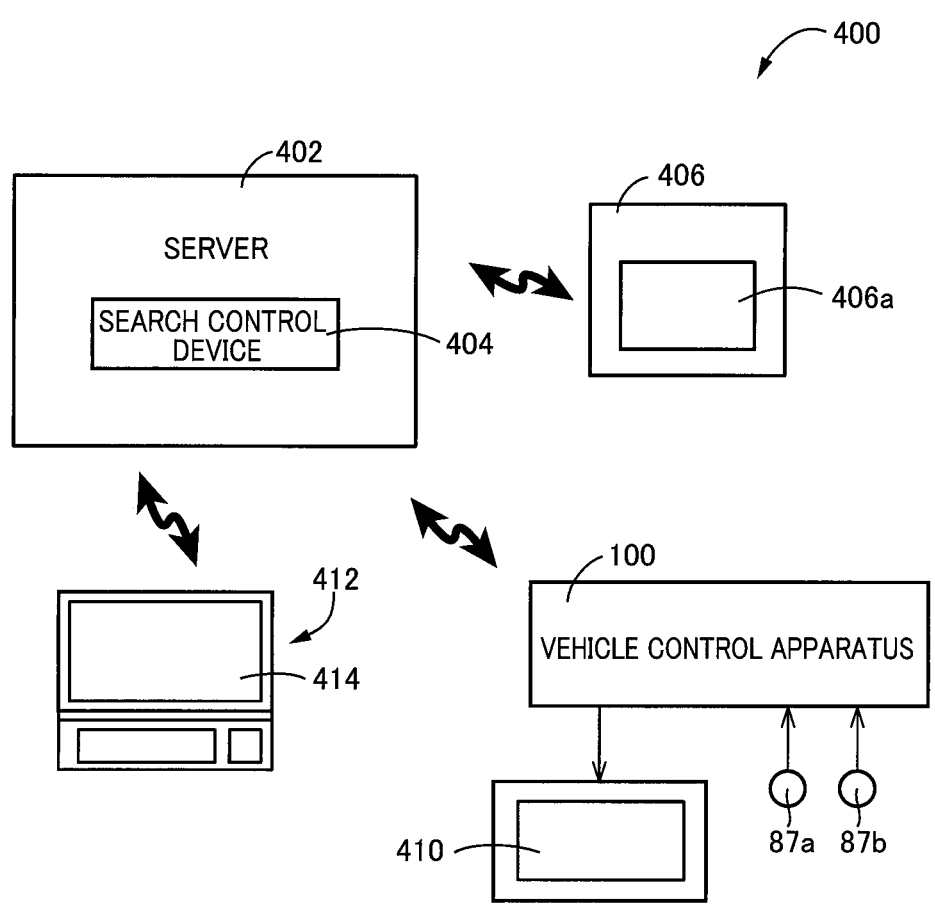
FIG. 13 is a view showing an overall construction of a sound-source search system according to still another embodiment of the present invention.

FIG. 13 is a view showing an overall construction of a sound-source search system 400 according to this third embodiment of the present invention. In the present third embodiment, a server 402 has a function of searing the noise-causing sound source. That is, the server 402 includes a search control device 404 having substantially the same function as the search control device 94b in the above-described first embodiment.

In the present third embodiment, the sound-source search system 400 includes a sound-source search device 406, the vehicle control apparatus 100, the first and second cameras 87a, 87b and the server 200. The sound-source search device 406 (hereinafter referred to as "search device 406") has a function of measuring the sound pressure SP, but does not have other functions such as a function of extracting the sound-source candidates and a function of presuming whether each of the sound-source candidates is the noise-causing sound source or not. That is, the sound-source search device 406 functions exclusively as a sound collecting device configured to measure the sound pressure PS. The result of measurement made by the search device 406, i.e., the sound data, is transmitted to the server 402 through the wireless communication. It is noted that a communication device such as a transceiver configured to receive and transmit information from and to various devices is not shown in FIG. 13. It is noted that the sound-source search system 400, search control device 404 and search device 406 correspond to "sound-source-candidate extraction system", "extracting device" and "acquiring device", respectively, which are recited in the appended claims.

Further, between the server 402 and the vehicle control apparatus 100 that is provided in the vehicle 10, various information can be transmitted and received through the wireless communication. For example, the history of the vehicle change events, and the running speed V and the accelerator opening degree θacc representing the driving state of the vehicle 10 in process of the collection of the sound during running of the vehicle 10, are transmitted to the server 402.

Further, in the present third embodiment, the server 402 has various control functions such as a function of extracting the sound-source candidates, based on the driving state, a function of extracting the sound-source candidates, based on the history of the vehicle change events and a function of presuming whether each of the sound-source candidates is the noise-causing sound source or not, so that the server 402 executes the various control operations. The sound data acquired by the sound-source search device 406 is transmitted to the server 402 through the wireless communication, and the history of the vehicle change events and the driving state (running speed V, accelerator opening degree θacc) upon the generation of the noise are transmitted to the server 402 through the wireless communication. The server 402 executes the various control operations, based on the various information transmitted to the server 402. Further, the various information required by the inspector for searching the noise-causing sound source are indicated, for example, in a display 406a that is provided in the search device 406. That is, the various information are transmitted from the server 402 to the search device 406 through the wireless communication, so as to be indicated in the display 406a of the search device 406. However, the various information required for searching the noise-causing sound source may be indicated in a display 410 provided inside the vehicle cabin, or in a display 414 provided in a mobile device 412 that is carried by the inspector.

As described above, in the sound-source search system 400 according to the third embodiment, the inspector searches the noise-causing sound source, by seeing the indications shown in the display 406a which are made based on the control operations performed by the search control device 404 provided in the server 402. Thus, in the third embodiment, too, the noise-causing sound source can be presumed without increasing the burden to the inspector. The specific process of searching the noise-causing sound source is basically the same as in the above-described first embodiment, and accordingly is not described.

Fourth Embodiment

Figure 14:
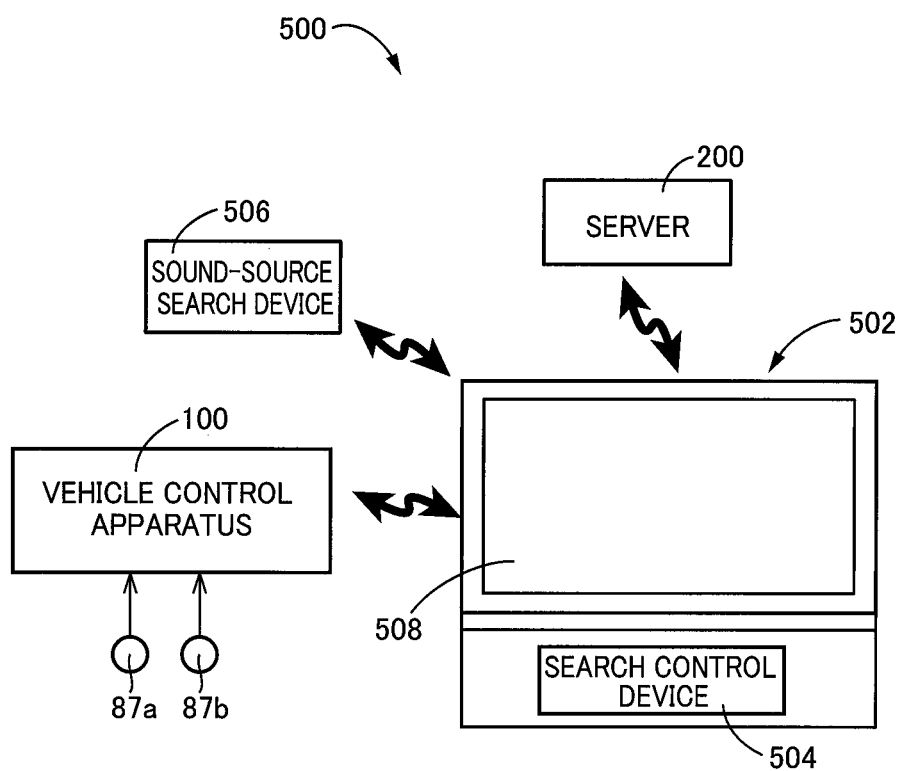
FIG. 14 is a view showing an overall construction of a sound-source search system according to still another embodiment of the present invention.

FIG. 14 is a view showing an overall construction of a sound-source search system 500 according to this fourth embodiment of the present invention. In the present fourth embodiment, a mobile device 502, which is to be carried by the inspector, has a function of searing the noise-causing sound source. That is, the mobile device 502 includes a search control device 504 having substantially the same function as the search control device 94b in the above-described first embodiment.

In the present fourth embodiment, the sound-source search system 500 includes a sound-source search device 506, the vehicle control apparatus 100, the server 200, the first and second cameras 87a, 87b and the mobile device 502. In the present fourth embodiment, a sound-source search device 506 (hereinafter referred to as "search device 506") has a function of measuring the sound pressure SP, but does not have various control functions such as a function of extracting the sound-source candidates and a function of presuming whether each of the sound-source candidates is the noise-causing sound source or not. That is, the sound-source search device 506 functions exclusively as a sound collecting device configured to measure the sound pressure PS. The result of measurement made by the search device 506, i.e., the sound data, is transmitted to the mobile device 502 through the wireless communication. It is noted that a communication device such as a transceiver configured to receive and transmit information from and to various devices is not shown in FIG. 14. It is noted that the sound-source search system 500, search control device 504 and search device 506 correspond to "sound-source-candidate extraction system", "extracting device" and "acquiring device", respectively, which are recited in the appended claims.

Further, between the server 200 and the mobile device 502, the information can be transmitted and received through the wireless communication. For example, when the sound-source candidate map of FIG. 3 is updated, the updated map is transmitted as needed from the server 200 to the mobile device 502. Further, where the sound-source candidate map of FIG. 3 is stored in the server 200, when the noise-causing sound source is to be searched, the sound-source candidate map corresponding to the type and the drive system of the vehicle is transmitted from the server 200 so as to be referred. Further, where the history of the vehicle change event of each vehicle, which is shown in FIG. 6, is stored in the server 200, when the sound-source candidate or candidates are to be extracted with reference to the history of vehicle change events, the history stored in the server 200 is referred to. Further, between the vehicle control apparatus 100 and the mobile device 502, the information can be transmitted and received through the wireless communication. For example, the history of the vehicle change events and the running speed V and the accelerator opening degree θacc representing the driving state of the vehicle 10 in process of the collection of the sound during running of the vehicle 10, are constantly transmitted to the mobile device 502.

Further, in the present fourth embodiment, the search control device 504 provided in the mobile device 502 has various control functions such as a function of extracting the sound-source candidates, based on the driving state, a function of extracting the sound-source candidates, based on the history of the vehicle change events and a function of presuming whether each of the sound-source candidates is the noise-causing sound source or not. Further, the various information required for searching the noise-causing sound source are indicated in the display 508 provided in the mobile device 502. Thus, the inspector presumes the noise-causing sound source, with reference to the indications shown in the display 508 of the mobile device 502. However, the various information required for searching the noise-causing sound source may be indicated in a display provided in the search device 506, or a display provided in the vehicle 10.

As described above, in the sound-source search system 500 according to the fourth embodiment, the inspector searches the noise-causing sound source, by seeing the indications shown in the display 506 which are made based on the control operations performed by the search control device 504 provided in the mobile device 502. Thus, in the fourth embodiment, too, the noise-causing sound source can be presumed without increasing the burden to the inspector. The specific process of searching the noise-causing sound source is basically the same as in the above-described first embodiment, and accordingly is not described.

While the preferred embodiments of this invention have been described in detail by reference to the drawings, it is to be understood that the invention may be otherwise embodied.

In the above-described embodiments, the sound-source candidate or candidates are extracted based on the history of the vehicle change events, in a case in which any sound-source candidate cannot be extracted in a process of checking whether the noise is generated or not during running of the vehicle 10 and extracting sound-source candidate or candidates based on the driving state upon generation of the noise. However, the sound-source candidate or candidates may be extracted based on the history of the vehicle change events, without the above-described process, namely, without trying to extract the sound-source candidate or candidates based on the driving state.

In the above-described embodiments, the various information are informed to the inspector, for example, through the display 94s of the search device 94. However, the information do not have to be informed to the inspector necessarily through the display but may be informed through a voice or sound, example. That is, means for informing the inspector of the various information may be modified as needed.

In the above-described first embodiment, the sound-pressure detection portion 94a, search control device 94b and display 94c of the search device 94 are constituted integrally with one another. However, they do not necessarily have to be constituted integrally with one another. For example, it is also possible to employ an arrangement in which the sound-pressure detection portion 94a is provided separately from the search control device 94b and display 94c, such the information or data can be transmitted and received between the sound-pressure detection portion 94a and the search control device 94b through the wireless communication or the like.

In the above-described embodiments, the first camera 87a configured to capture the image inside the vehicle cabin and the second camera 87b configured to capture the image outside the vehicle cabin, are both provided. However, the first and second cameras 87a, 87b may be replaced by a 360-degree camera configured to capture images inside and outside the vehicle cabin.

In the above-described embodiments, the generation of the noise can be determined also by using the high-speed camera 87c configured to detect the generation of the vibration or the acoustic camera 87d configured to detect the generation of the noise. However, at least one of the first and second cameras 87a, 87b, each of which serves as the imaging device in the above-described embodiments, may be provided with a function of a high-speed camera and/or a function of an acoustic camera, so as to serve also as the acquiring device configured to acquire the vibration data or sound data of the sound-source candidate. Further, the first and second cameras 87a, 87b may be replaced by a single camera configured to configured to capture images inside and outside the vehicle cabin.

In the above-described embodiments, each the search devices 94, 306, 406, 506 is installed basically inside the vehicle cabin, for searching the sound source that causes the noise propagated inside the vehicle cabin. However, where the noise propagated outside the vehicle cabin, for example, during stop (idling) of the vehicle 10, is an issue to be solved, the search devices 94, 306, 406, 506 may be installed outside the vehicle cabin. That is, the present invention is applicable also to a case in which the sound source that causes the noise propagated outside the vehicle cabin is to be searched.

In the above-described first embodiment, when it is checked whether the noise is generated or not, without the part as the sound-source candidate being removed or replaced, the second measuring position in addition to the first measuring position is set, so that the generation of the noise is determined based on the sound data acquired through the sound measurement made with the search device 94 being installed in the second measuring position in addition to the sound data acquired through the sound measurement made with the search device 94 being installed in the first measuring position. However, it may be presumed whether the sound-source candidate is the noise-causing sound source or not, based on not only the sound data acquired through the sound measurement made with the search device 94 being installed in the first and second measuring position but also the sound data acquired through the sound measurement made with the search device 94 being installed in a third measuring position in the form of a position C shown in FIG. 7, for example. The position C as the third measuring position is a position which is sufficiently distant from the sound-source candidate, and in which the noise is not substantially detected even when the noise generated at the sound-source candidate. Therefore, when the noise is not substantially detected by the search device 94 in a state in which the search device 94 is installed in the third measuring position, it can be presumed that the sound-source candidate is the noise-causing sound source. Thus, the accuracy of presuming the noise-causing sound source can be further increased by setting the increased number of positions as the sound measuring position of the search device 94.

In the above-described embodiments, the interior of the vehicle cabin is displayed in a two dimensional manner in the display such as the display 94c of the search device 94. However, the interior of the vehicle cabin may be displayed in a three dimensional manner.

In the above-described first embodiment, the search control device 94b executes all the control steps such as extraction of the sound-source candidates and presumption of the noise-causing sound source, which are to be executed when the noise-causing sound source are searched. However, at least one of the control steps may be executed in the server 200 or in the vehicle control apparatus 100. For example, the extraction of the sound-source candidates and the presumption of the noise-causing sound source may be executed in the server 200. Similarly, in each of the second through fourth embodiments, too, at least one of the control steps, which are executed by a corresponding one of the search control devices 304, 404, 504, may be executed by another control device.

In the above-described first embodiment, the sound-source search system 8 includes the server 200. However, the sound-source search system 8 does not have to include the server 200, in an arrangement in which the sound-source candidate map of FIG. 3 and the measuring position map are pre-stored in the search control device 94b so that no information is transmitted and received between the search control device 94b and the server 200. Similarly, each of the sound-source search system 300, 500 in the second and fourth embodiment does not necessarily have to include the server 200, either.

In the above-described first embodiment, the various information are indicated in the display 94c of the search device 94, so as to be informed to the inspector. However, the various information may be indicated in a display provided in the vehicle 10 or a display provided in a mobile device carried by the inspector.

In the above-described embodiments, the sound-source candidates are extracted depending on the vehicle running speed V (or value related to the running speed V) and the accelerator opening degree θacc (or value related to the accelerator opening degree θacc). However, in addition to the vehicle running speed V and the accelerator opening degree θacc, the gear position established in the step-variable transmission portion 20 or an overall gear ratio established in the power transmission apparatus 12 constituted by the continuously-variable transmission portion 18 and the step-variable transmission portion 20 may be taken into account when the sound-source candidates are to be extracted. Moreover, the sound-source candidates may be extracted depending on one of the vehicle running speed V (or value related to the running speed V) and the accelerator opening degree θacc (or value related to the accelerator opening degree θacc).

In the above-described embodiments, the vehicle 10 is provided with the power transmission apparatus 12 including the continuously-variable transmission portion 18 and the step-variable transmission portion 20 that are connected to each other in series. However, the provision of the power transmission apparatus 12 including the continuously-variable transmission portion 18 and the step-variable transmission portion 20 is not essential. For example, in the vehicle to which the present invention is applied, an engine and a rotating machine may be connected to each other without provision of the differential mechanism 32 or the like therebetween, and a step-variable transmission may be provided between drive wheels and the drive power sources (i.e., the engine and the rotating machine), wherein the step-variable transmission may be replaced with a belt-type continuously-variable transmission.

In the above-described embodiments, the vehicle 10 is a hybrid electric vehicle having the drive power sources in the form of the engine 14 and the second rotating machine MG2. However, the vehicle to which the present invention is applied does not have to be necessarily a hybrid electric vehicle, but may be an engine vehicle or electric vehicle having only one drive power source in the form of the engine 14 or rotating machine, for example. That is, the present invention is not limited to vehicles having certain types of drive power sources and certain types of drive systems, for example.

In the above-described embodiments, the vehicle 10 is provided with a function of the automatic drive control. However, the provision of the automatic drive function is not essential, and the present invention is applicable also to a vehicle that is to be driven only manually.

It is to be understood that the embodiments described above are given for illustrative purpose only, and that the present invention may be embodied with various modifications and improvements which may occur to those skilled in the art.

NOMENCLATURE OF ELEMENTS

8; 300; 400; 500: sound-source search system (sound-source-candidate extraction system)
87a: first camera (imaging device)
87b: second camera (imaging device)
87c: high-speed camera (acquiring device)
87d: acoustic camera (acquiring device)
94; 306; 406; 506: sound-source search device (acquiring device)
94b; 304; 404; 504: search control device (extracting device)

What is claimed is:

1. A sound-source-candidate extraction system for locating a candidate of a sound source that causes a noise generated from a vehicle and propagated inside or outside a cabin of the vehicle, the sound-source-candidate extraction system comprising:
    a camera configured to acquire data of an image inside or outside the cabin of the vehicle; and
    a microcomputer configured to locate the candidate of the sound source, depending on a difference between first and second image data acquired by the camera, wherein
    the microcomputer is configured to determine whether the noise has been generated or not, based on data of sounds collected by a microphone or based on information which is inputted from a user of the vehicle and which indicates that the noise has been generated, and
    the first image data is the data of the image before the microcomputer determines that the noise has been generated, and the second image data is the data of the image when or after the microcomputer determines that the noise has been generated.

2. The sound-source-candidate extraction system according to claim 1, further comprising a memory configured to store therein a history of vehicle change events including an image-detected change event that was detected in the data of the image,
    wherein the microcomputer is configured, in a case in which the image-detected change event occurred after the first image data was acquired by the camera and before the second image data was acquired by camera, to extract, as the candidate of the sound source, a part changed by the image-detected change event that caused the difference between the first and second image data.

3. The sound-source-candidate extraction system according to claim 2,
    wherein the history of the vehicle change events stored in the memory includes, in addition to the image-detected change event, a recorded change event that was recognized without depending on the data of the image and recorded in the history of the vehicle change events.

4. A sound-source search method of searching a sound source that causes a noise generated from a vehicle and propagated inside or outside a cabin of the vehicle, the sound-source search method comprising:
    acquiring, by a camera, data of an image inside or outside the cabin of the vehicle;
    locating, by a microcomputer, a candidate of the sound source, depending on a difference between first and second image data acquired by the camera; and
    determining, by the microcomputer, whether the noise has been generated or not, based on data of sounds collected by a microphone or based on information which is inputted from a user of the vehicle and which indicates that the noise has been generated, wherein
    the first image data is the data of the image before the microcomputer determines that the noise has been generated, and the second image data is the data of the image when or after the microcomputer determines that the noise has been generated.

* * * * *